United States Patent
Velankar et al.

(10) Patent No.: US 12,522,780 B2
(45) Date of Patent: Jan. 13, 2026

(54) ODORANTS AND COMPOSITIONS COMPRISING ODORANTS

(71) Applicant: S H KELKAR AND COMPANY LIMITED, Maharashtra (IN)

(72) Inventors: Avdhoot D. Velankar, Mumbai (IN); Kedar Ramesh Vaze, Mumbai (IN); Popat D. Shinde, Mumbai (IN); Aftab Sayyed, Mumbai (IN)

(73) Assignee: S H KELKAR AND COMPANY LIMITED (IN)

( * ) Notice: Subject to any disclaimer, the term of this patent is extended or adjusted under 35 U.S.C. 154(b) by 560 days.

(21) Appl. No.: 17/918,490

(22) PCT Filed: Apr. 15, 2021

(86) PCT No.: PCT/IB2021/053112
§ 371 (c)(1),
(2) Date: Oct. 12, 2022

(87) PCT Pub. No.: WO2021/209944
PCT Pub. Date: Oct. 21, 2021

(65) Prior Publication Data
US 2023/0141482 A1      May 11, 2023

(30) Foreign Application Priority Data

Apr. 16, 2020  (IN) .............................. 202021016498
Jun. 11, 2020  (EP) ...................................... 20179475

(51) Int. Cl.
| | |
|---|---|
| *C11B 9/00* | (2006.01) |
| *A23L 27/20* | (2016.01) |
| *A61K 8/40* | (2006.01) |
| *A61Q 5/02* | (2006.01) |
| *A61Q 13/00* | (2006.01) |
| *C07C 255/16* | (2006.01) |

(52) U.S. Cl.
CPC .......... *C11B 9/0007* (2013.01); *A23L 27/202* (2016.08); *A61K 8/40* (2013.01); *A61Q 5/02* (2013.01); *A61Q 13/00* (2013.01); *C07C 255/16* (2013.01)

(58) Field of Classification Search
CPC ...... C11B 9/0007; A23L 27/202; A23L 27/84; A23L 27/88; A61K 8/40; A61Q 5/02; A61Q 13/00; C07C 255/16; C07C 255/13
See application file for complete search history.

(56) References Cited

U.S. PATENT DOCUMENTS

| | | | |
|---|---|---|---|
| 4,160,775 A * | 7/1979 | Schilling, Jr. ......... | C07F 7/0838 556/460 |
| 5,294,602 A | 3/1994 | Brunke et al. | |
| 5,618,784 A * | 4/1997 | Davey ................... | C07C 255/13 512/6 |
| 2017/0088503 A1 | 3/2017 | Adachi et al. | |

FOREIGN PATENT DOCUMENTS

| | | |
|---|---|---|
| DE | 26 01 825 A1 | 7/1977 |
| WO | 94/13626 A1 | 6/1994 |

OTHER PUBLICATIONS

European Patent Office; International Search Report and Written Opinion issued in Int'l App No. PCT/IB2021/053112 dated Jul. 8, 2021, 14 pages.

\* cited by examiner

*Primary Examiner* — Cephia D Toomer
(74) *Attorney, Agent, or Firm* — MASCHOFF BRENNAN

(57) ABSTRACT

The present invention relates to new classes of odorous 3-(2-methylenealkoxy)alkanenitrile derivatives of formula (I) which are useful as fragrance or flavor materials in particular in providing dry, woody, dusty, earthy, and/or patchouli notes together with optional coriander, aldehydic, citrus, mandarin, pear, cinnamon, and/or petal floral-like notes to perfume, aroma or deodorizing/masking compositions.

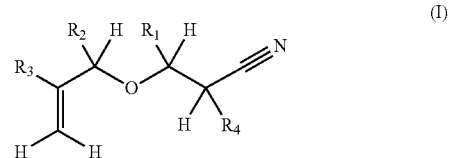

15 Claims, No Drawings

ODORANTS AND COMPOSITIONS COMPRISING ODORANTS

FIELD OF THE INVENTION

The present invention relates to new classes of odorous 3-(2-methylenealkoxy)alkanenitrile derivatives which are useful as fragrance or flavor materials in particular in providing dry, woody, dusty, earthy, and/or patchouli notes together with optional coriander, aldehydic, citrus, mandarine, pear, cinnamon, and/or petal floral-like notes to perfume, aroma or deodorizing/masking compositions. The present invention also relates to fragrance, flavor and/or deodorizing/masking compositions comprising said new classes of odorous 3-(2-methylenealkoxy)alkanenitrile derivatives. The present invention furthermore refers to the said odorants that can be used in the novel fragrance, flavor and/or deodorizing/masking compositions of the present invention. The present invention also refers to a method for the production of the said odorants/compounds and of the corresponding fragrance, flavor and/or deodorizing/masking compositions containing said odorants/compounds.

BACKGROUND OF THE INVENTION

Nitriles represent an important class of organic compounds that are used in perfumery and fragrance industry. Nitriles are chemically more stable than corresponding aldehydes. In fact, an important characteristic of a nitrile group is its robustness in acidic or basic media. There are saturated and unsaturated aliphatic nitriles with both linear and branched carbon skeletons, cycloaliphatic and aromatic nitriles, as well as those containing combinations of aromatic and aliphatic substituents. (Mark Erman, Perfumer & Flavorist, 27, 30-34, 2002).

For example, Parmanyl (3-(hexenyloxy)-propane-nitrile) and few other compounds have been disclosed in U.S. Pat. No. 5,294,602 which claims 3-(hexenyloxy)-propane nitriles of general formula $R_3$—O—$CHR_1$—$CHR_2$—CN in which $R_3$ is an unbranched hexenyl residue and $R_1$ and $R_2$ are selected from the group consisting of H and $CH_3$. The nine compounds disclosed in Table 1 of U.S. Pat. No. 5,294,602 predominantly display green and fruity odor notes. WO9413626 (A1) claims 3-(2-methylbut-1-oxy)-2-methylpropionitrile and 3-(3-methylbut-1-oxy)-2-methylpropionitrile compounds useful as fragrance materials with jasmine-type odors with lactonic notes. DE2601825 discloses ether nitriles of general formula R—$(CH2)_m$-A-$(CH_2)_n$-O—$(CH_2)_2$—CN (where R=H, $(CH_3)_2CH$— or $CH_3C(=CH_2)$—; A=a C—C bond or —$C(CH_3)$=CH—; m=1-8 and n=1-5 with the proviso that the total no. of C in the general formula=7-15). The disclosed compounds include 3-((3-methylbut-3-en-1-yl)oxy)propanenitrile, n-hexyloxypropionitrile, n-octyloxypropionitrile and geranyloxypropiontrile. DE2601825 recites that their claimed compounds have odors which are floral-aromatic-fruity in nature. DE2639182 discloses 3-(10-undecenyloxy)-propanenitrile which was reported to have weak fruity odor (reminiscent of pineapple).

In continued search of novel fragrant molecules that have unique odour profile and can fulfill demands of fragrance industry, we were interested in novel organic compounds that would have varied organoleptic effects to composition. During this exploration, we have designed 3-(2-methylenealkoxy)alkanenitrile derivatives. Surprisingly, we found that compounds of general formula (I) that can be derived from 2-methylene-aldehydes have unique and diverse odour profile like dry, woody, dusty, earthy, and/or patchouli notes. We also found that our claimed compounds could be synthesised with advantageous stepwise operations compared to the prior art. Finally, we found that our claimed compounds and the claimed perfume, aroma and/or deodorizing/masking compositions comprising said compounds exhibit superior properties, inter alia stability properties. It is instructive to note that compounds like parmanyl have different odor properties as compared with compounds represented in formula (I).

SUMMARY OF THE INVENTION

This invention discloses novel fragrance, flavor and/or deodorizing/masking compositions comprising substituted 3-(2-methylenealkoxy)alkanenitrile derivatives selected from compounds of formula (I)

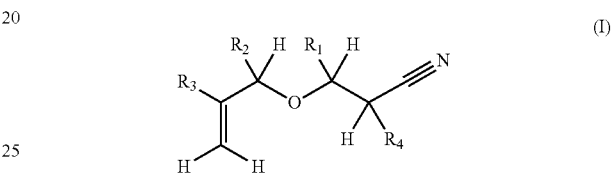

(I)

wherein $R_1$ is a hydrogen atom or a methyl group; $R_2$ is a hydrogen atom or an alkyl group having up to 9 carbon atoms or an alkenyl group containing up to 9 carbon atoms; $R_3$ is either an alkyl group having up to 9 carbon atoms or an alkenyl group containing up to 9 carbon atoms; $R_4$ is a hydrogen atom or a methyl group or an alkyl group having up to 9 carbon atoms or an alkenyl group containing up to 9 carbon atoms; with the proviso that when $R_3$ is a methyl group, $R_2$ is hydrogen and $R_4$ is hydrogen, $R_1$ cannot be hydrogen or a methyl group, and when $R_3$ is a methyl group, $R_2$ is hydrogen and $R_4$ is a methyl group, $R_1$ cannot be hydrogen.

In an embodiment according to the present invention, $R_2$ can advantageously be straight chain and/or branched alkyls/alkenyls, for example $R_2$ is an alkyl/alkenyl group having up to carbon atoms. In an embodiment according to the present invention, $R_3$ can advantageously be straight chain and/or branched alkyls/alkenyls.

In an embodiment according to the present invention, $R_3$ is methyl, ethyl, n-propyl, i-propyl, n-butyl, n-pentyl, n-hexyl, n-heptyl, n-octyl, n-nonyl or 9-octenyl.

In an embodiment according to the present invention, $R_2$ is hydrogen, methyl, ethyl, n-propyl, i-propyl, n-butyl, isobutyl, n-pentyl, n-hexyl, n-heptyl, n-octyl, n-nonyl or 9-octenyl.

In an embodiment according to the present invention, $R_4$ is hydrogen, methyl, ethyl, n-propyl, i-propyl, n-butyl, isobutyl, n-pentyl, n-hexyl, n-heptyl, n-octyl, n-nonyl or 9-octenyl. In an embodiment according to the present invention, $R_4$ is a hydrogen atom or a methyl group or an alkyl group having up to 4 carbon atoms, for example a hydrogen atom or a methyl group.

In another embodiment, compounds of formula (I) of this invention can be chiral, e.g. they can be used as stereoisomeric (enantiomeric or diastereomeric) mixtures. In another embodiment, compounds of formula (I) of this invention can be chiral, e.g. they can be used as stereoisomeric (enantiomeric or diastereomeric) mixtures, more specifically as mixture of enantiomers, a racemic mixture and/or a nonracemic mixture of isomers can also be advantageously used. In another embodiment, compounds of the formula (I) can be used advantageously in pure form.

DETAILED DESCRIPTION

The term "odorant" characterizing the compounds according to the present invention means that in humans it triggers an odor sensation, which is preferably pleasant; it is, therefore, conventionally used for perfuming industrial and sanitary articles, washing agents, cleaning agents, personal hygiene products, cosmetics and the like. For the purposes of the present invention and appended claims, the term "odorant" includes "aroma substances". Aroma substances is the term usually used to designate substances, which provide odor and/or flavor to foodstuffs.

The alkenoxynitrile compounds of formula (J) may be used alone, as mixtures thereof, or in combination with a base material.

As used herein, the "base material" includes all known fragrance/flavor materials selected from an extensive range of natural products like: essential oils, extracts, resinoids or isolates and synthetic materials currently available, such as: hydrocarbons, alcohols, aldehydes and ketones, ethers and acetals, esters and lactones, nitriles, oximes or heterocycles, and/or in admixture with one or more ingredients or excipients/adjuvants conventionally used in conjunction with odorants in fragrance and/or flavor compositions, for example: solvents/diluents, stabilizers, carrier materials, and other auxiliary agents commonly used in the art.

The alkenoxynitrile compounds of formula (I) may be used in a broad range of fragrance applications, e.g. in any field of fine and functional perfumery, such as perfumes, air care products, household products, laundry products, body care products and cosmetics. The compounds can be employed in widely varying amounts, depending upon the specific application and on the nature and quantity of other odorant ingredients.

According to a preferred embodiment of the invention, the fragrance, flavor and/or deodorizing/masking composition according to the present invention contains at least one alkenoxynitrile compound of formula (I) as previously described, in quantities of at least 0.00001 wt. %, for example at least 0.0001 wt. %, for example at least 0.001 wt. %, preferably at least 0.01 wt. %, more advantageously at least 0.1 wt, %, in particular at least 1 wt %, in each case relative to the entire composition; in an embodiment, said alkenoxynitrile compounds of formula (I) are present in the composition in quantities below 99.9 wt. %, for example below 95 wt. %, for example below 50 wt. %, preferably below 25 wt. %, for example below 15 wt. %, below 10 wt. %, or even below 5 wt. %, in each case relative to the entire composition.

According to a particularly preferred embodiment of the invention, in addition to the compound of formula (I) according to the present invention, the fragrance, flavor and/or deodorizing/masking composition according to the present invention contains additional odorants, for example in a quantity of 0.1 to 99.9 wt. %, preferably 5-90 wt. %, in particular 15-70 wt. %, relative to the entire fragrance and/or flavor composition.

The compounds of formula (I) as described hereinabove may be employed in a consumer product base simply by directly mixing at least one compound of formula (I), or a fragrance composition comprising said compound of formula (I) with the consumer product base; or they may, in an earlier step, be entrapped with an entrapment material, for example, polymers, capsules, microcapsules and/or nanocapsules, liposomes, film formers, absorbents such as active carbon or zeolites, cyclic oligosaccharides, cyclic glycourils, and mixtures of two or more thereof, or they may be chemically bonded to substrates, which are adapted to release the fragrance molecule upon application of an external stimulus such as light, enzyme, air, water or the like, and then mixed with the consumer product base.

Thus, the invention can be useful for existing methods of manufacturing a fragrance, flavor and/or deodorizing/masking composition, comprising the incorporation of a compound of formula (I), as a fragrance, flavor and/or deodorizing/making ingredient, either by directly admixing the compound to the consumer product base or by admixing a fragrance, flavor and/or deodorizing/masking composition comprising said compound of formula (I), which may then be mixed with a consumer product base, using conventional techniques and methods. Through the addition of an olfactory-acceptable amount of at least one compound of formula (I) of the present invention as hereinabove described, the odor notes of a consumer product base can be improved, enhanced, and/or modified.

The present invention discloses novel fragrance, flavor and/or deodorizing/masking compositions comprising substituted 3-(2-methylenealkoxy)alkanenitrile derivatives selected from compounds of formula (I)

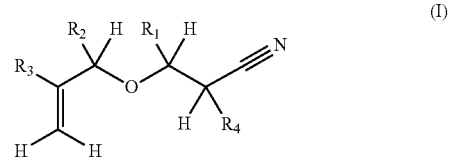

wherein $R_1$ is a hydrogen atom or a methyl group; $R_2$ is a hydrogen atom or is either an alkyl group having up to 9 carbon atoms or an alkenyl group containing up to 9 carbon atoms; $R_3$ is either an alkyl group having up to 9 carbon atoms or an alkenyl group containing up to 9 carbon atoms; $R_4$ is a hydrogen atom or a methyl group or an alkyl group having up to 9 carbon atoms or an alkenyl group containing up to 9 carbon atoms; with the proviso that
  when $R_3$ is a methyl group, $R_2$ is hydrogen and $R_4$ is hydrogen, $R_1$ cannot be hydrogen or a methyl group, and
  when $R_3$ is a methyl group, $R_2$ is hydrogen and $R_4$ is a methyl group, $R_1$ cannot be hydrogen.

In an embodiment according to the present invention, the fragrance, flavor and/or deodorizing/masking composition comprises compound or compounds of formula (P) which is/are selected from the following compounds.
1) 3-(3-methyl-2-methylenebutoxy)propanenitrile
2) 3-((5-methyl-4-methylenehexan-3-yl)oxy)butanenitrile
3) 3-(2-methylenebutoxy)propanenitrile
4) 3-(2-methylenebutoxy)butanenitrile
5) 3-((3-methylenepentan-2-yl)oxy)propanenitrile
6) 3-((3-methylenepentan-2-yl)oxy)butanenitrile
7) 3-((4-methylenehexan-3-yl)oxy)propanenitrile
8) 3-((4-methylenehexan-3-yl)oxy)butanenitrile
9) 3-((2-methylenepentyl)oxy)propanenitrile
10) 3-((3-methylenehexan-2-yl)oxy)propanenitrile
11) 3-((3-methylenehexan-2-yl)oxy)butanenitrile
12) 3-((4-methyleneheptan-3-yl)oxy)propanenitrile
13) 3-((2-methylenehexyl)oxy)propanenitrile
14) 3-((2-methylenehexyl)oxy)butanenitrile 15) 3-((4-methyleneoctan-3-yl)oxy)propanenitrile
16) 3-((4-methyleneoctan-3-yl)oxy)butanenitrile
17) 3-((2-methyleneheptyl)oxy)propanenitrile
18) 3-((2-methyleneheptyl)oxy)butanenitrile
19) 3-((3-methyleneoctan-2-yl)oxy)propanenitrile
20) 3-((3-methyleneoctan-2-yl)oxy)butanenitrile
21) 3-((4-methylenenonan-3-yl)oxy)propanenitrile
22) 3-((4-methylenenonan-3-yl)oxy)butanenitrile
23) 3-((2-methyleneoctyl)oxy)butanenitrile
24) 3-((3-methylenenonan-2-yl)oxy)propanenitrile
25) 3-((4-methylenedecan-3-yl)oxy)propanenitrile
26) 3-((4-methylenedecan-3-yl)oxy)butanenitrile
27) 3-((2-methylenenonyl)oxy)propanenitrile
28) 3-((3-methylenedecan-2-yl)oxy)propanenitrile
29) 3-((3-methylenedecan-2-yl)oxy)butanenitrile
30) 3-((2-methylenedec-9-en-1-yl)oxy)propanenitrile
31) 3-((2-methylenedec-9-en-1-yl)oxy)butanenitrile
32) 3-((2-methyl-5-methylenenonan-4-yl)oxy)propanenitrile
33) 3-((2-methyl-5-methylenenonan-4-yl)oxy)butanenitrile
34) 3-((6-methylenedecan-5-yl)oxy)propanenitrile
35) 3-((6-methylenedecan-5-yl)oxy)butanenitrile
36) 2-(((2-methylenehexyl)oxy)methyl)hexanenitrile
37) 2-(((2-methylenehexyl)oxy)methyl)pentanenitrile
38) 3-methyl-2-(((2-methylenehexyl)oxy)methyl)butanenitrile
39) 2-((3-methyl-2-methylenebutoxy)methyl)pentanenitrile
40) 3-((5-methylenenon-1-en-4-yl)oxy)propanenitrile
41) 3-((5-methylenenon-1-en-4-yl)oxy)butanenitrile
42) 2-(((2-methylenehexyl)oxy)methyl)butanenitrile In an embodiment, the present invention also claims novel compounds of formula (I) (preferably novel odorant compounds of formula (I)) useful in a fragrance, flavor and/or deodorizing/masking composition,

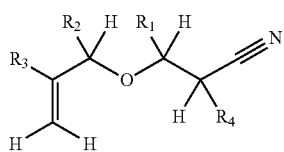

(I)

wherein $R_1$ is a hydrogen atom or a methyl group; $R_2$ is a hydrogen atom or is either an alkyl group having up to 9 carbon atoms or an alkenyl group containing up to 9 carbon atoms; $R_3$ is either an alkyl group having up to 9 carbon atoms or an alkenyl group containing up to 9 carbon atoms; $R_4$ is a hydrogen atom or a methyl group or an alkyl group having up to 9 carbon atoms or an alkenyl group containing up to 9 carbon atoms; with the proviso that
  when $R_3$ is a methyl group, $R_2$ is hydrogen and $R_4$ is hydrogen, $R_1$ cannot be hydrogen or a methyl group, and
  when $R_3$ is a methyl group, $R_2$ is hydrogen and $R_4$ is a methyl group, $R_1$ cannot be hydrogen.

In an embodiment according to the present invention, $R_2$ can advantageously be straight chain and/or branched alkyls/alkenyls. In an embodiment according to the present invention, $R_3$ can advantageously be straight chain and/or branched alkyls/alkenyls. In embodiment according to the present invention $R_4$ can advantageously be straight chain and/or branched alkyls/alkenyls.

In an embodiment according to the present invention, $R_3$ is methyl, ethyl, n-propyl, i-propyl, n-butyl, n-pentyl, n-hexyl, n-heptyl, n-octyl, n-nonyl or 9-octenyl. In an embodiment according to the present invention, $R_2$ is hydrogen, methyl, ethyl, n-propyl, i-propyl, n-butyl, isobutyl, n-pentyl, n-hexyl, n-heptyl, n-octyl, n-nonyl or 9-octenyl.

In an embodiment according to the present invention, $R_4$ is hydrogen, methyl, ethyl, n-propyl, i-propyl, n-butyl, isobutyl, n-pentyl, n-hexyl, n-heptyl, n-octyl, n-nonyl or 9-octenyl. In an embodiment according to the present invention, $R_4$ is a hydrogen atom or a methyl group or an alkyl group having up to 4 carbon atoms, for example a hydrogen atom or a methyl group.

In an embodiment, the present invention also claims the use of said novel compounds of formula (I) in a fragrance, flavor and/or deodorizing/masking composition for imparting dry, woody, dusty, earthy, and/or patchouli notes together with optional coriander, aldehydic, citrus, mandarine, pear, cinnamon, and/or petal floral-like notes to said composition.

In an embodiment according to the present invention, the fragrance, flavor and/or deodorizing/masking composition comprises a compound of formula (I) which is selected from any of the compounds and/or from a mixture of two or more of the said compounds given above.

After performing organoleptic evaluation studies, the applicants have also discovered that the compounds represented by formula (I) may additionally display aldehydic, coriander like, citrus, mandarine, pear, cinnamon like profile that enhances freshness of a citrus composition. Additionally, the compounds represented by formula (I) exhibit woody, earthy, dusty characteristics. Further, the compounds represented by formula (I) may also give floral, vegetative and green notes.

The Applicants were surprised to find that compounds of general formula (I) enhanced effects of various types of fragrance compositions. Detailed evaluations have been described later.

It was very interesting to note that variety of effects like strong woody, strong citrus, powerful rose effects were displayed depending on the type of compositions.

In an embodiment of the present invention, the claimed fragrance, flavor and/or deodorizing/masking composition is advantageously used as a perfumery composition. Perfumery compositions according to the present invention generally include a perfume, a cologne, an eau du toilette, and/or an eau de parfum. In an embodiment of the present invention, the claimed fragrance, flavor and/or deodorizing/masking composition is advantageously used in a cosmetic formulation, a personal care product, a cleansing product, a fabric softener, and/or air freshener, and the like. Furthermore, it is within the purview of embodiments of the invention that the novel fragrance, flavor and/or deodorizing/masking composition(s) and/or compound(s) of formula (I) described herein may be integrated into building materials, wall and floor coverings, vehicle components, and the like.

In general, in addition to the novel odorant and/or fragrance, flavor and/or deodorizing/masking compositions described herein, suitable fragrance, flavor or deodorizing compositions may advantageously include conventional ingredients such as, for example, solvents, carriers, stabilizers, emulsifiers, moisturizers, dispersants, diluents, thickeners, thinners, other odorants, and/or adjuvants, and the like.

The compounds of formula (I) combine with numerous known natural or synthetic fragrance, flavor and/or deodorizing/masking materials, whereby the range of the natural ingredients can embrace not only readily-volatile but also semi-volatile and slightly-volatile components and the range of the synthetic ingredients can embrace representatives from many classes of substances, such as described in Steffen Arctander, Perfume and Flavor Chemicals, vol. 1&2, Montclair, N.J., 1969; Steffen Arctander, Perfume and Flavor Materials of Natural Origin, Elizabeth, N.J., 1960 or Horst Surburg, Johannes Panten, Common Fragrance and Flavor Materials, Wiley-VCH, Weinheim, 2016 and as will be evident from the following nonlimiting compilation:

Natural products such as: Ajowan oil, Amyris oil, Armoise oil, Artemisia oil, Basil oil, Bees wax absolute, Bergamot oil, Birch tar oil, Black pepper oil, Black pepper oleoresin, Camphor oil, Cananga oil, Caraway oil, Cardamom oil, Carrot seed oil, Castoreum absolute, Cedar leaf oil, Cedarwood oil, Celery seed oil, Chamomile oil, Cinnamon bark oil, Cinnamon leaf oil, Cistus absolute, Cistus oil, Citronella oil, Citronella terpenes, Clary sage oil, Clove oil rectified, Cognac oil white, Coriander seed oil, Cumin seed oil, Cypress oil, Davana oil, Dill seed oil, Elemi oil, Elemi resinoid, Eucalyptus oil, Fir needle oil, Galbanum oil, Geranium oil, Ginger oil Indian, Grapefruit oil, Guaiacwood oil, Gurjun balsam, Jasmin absolute, Jatamansi oil, Juniper berry oil, Juniper leaf oil, Kachur oil, Labdanum absolute, Labdanum resinoid, Lavender oil, Lemon oil, Lemon oil terpenes, Lemongrass oil, Lime oil, *Litsea cubeba* oil, *Litsea cubeba* terpenes, Lobhan choya resinoid, Mandarin oil, *Mentha arvenis* oil, *Mentha citrata* oil, Mimosa absolute, Myrrh resinoid, Nagarmotha oil, Nutmeg oil, Oakmoss absolute, Oakmoss resinoid, Olibanum oil, Olibanum resinoid, Orange oil, Origanum oil, Palma rosa oil, Patchouli oil, Peppermint oil, Peru Balsam resinoid, Petitgrain oil, Pine needle oil, Pink pepper oil, Rose absolut, Rose oil, Rosemary oil, Sandalwood oil, Seaweed absolute, Spearmint oil, Sugandh kokila oil, Sugandh mantri oil, Tagete oil, Tolu Balsam resinoid, Tuberose absolute, Turmeric oil, Turpentine oil, Valerian oil, Vetiver oil, Vetiver terpenes.

Synthetic raw materials for instance: Esters such as: Aldehyde C16, Allyl amyl glycolate, Allyl caproate, Allyl cyclohexyl propionate, Allyl heptoate, Allyl phenoxy acetate, Amyl acetate iso, Amyl benzoate, Amyl butyrate, Amyl caproate, Amyl cinnamate, Amyl isovalerate, Amyl phenyl acetate, Amyl propionate, Amyl salicylate iso, Amyris acetate, Anisyl acetate, Benzyl acetate, Benzyl benzoate, Benzyl butyrate, Benzyl cinnamate, Benzyl formate, Benzyl isobutyrate, Benzyl isoeugenol, Benzyl propionate, Benzyl salicylate, Benzyl tiglate, Butyl acetate, Butyl butyrate, Butyl butyryl lactate, Caryophyllene acetate, Cedryl acetate, Cinnamyl acetate, Cinnamyl butyrate, Cis-3-hexenyl acetate, Cis-3-hexenyl benzoate, Cis-3-hexenyl caproate, Cis-3-hexenyl formate, Cis-3-hexenyl isobutyrate, Cis-3-hexenyl-2-methyl butyrate, Cis-3-hexenyl propionate, Cis-3-hexenyl salicylate, Cis-3-hexenyl tiglate, Citronellyl acetate, Citronellyl butyrate, Citronellyl formate, Citronellyl isobutyrate, Citronellyl propionate, Citronellyl tiglate, Cyclabute, Cyclogalbanate, Cyclohexyl ethyl acetate, Decyl acetate, Dibutyl phthalate, Diethyl malonate, Diethyl phthalate, Dihydromyrcenyl acetate, Dimethyl octanyl acetate, Dimethyl phenyl ethyl carbinyl acetate, Dioctyl adipate, Dioctyl phthalate, Dimethyl benzyl carbinyl acetate, Dimethyl benzyl carbinyl butyrate, Ethyl linalyl acetate, Ethyl 2-methyl butyrate, Ethyl 3-phenyl propionate, Ethyl acetate, Ethyl acetoacetate, Ethyl benzoate, Ethyl butyrate, Ethyl caprate, Ethyl caproate, Ethyl caprylate, Ethyl cinnamate, Ethyl heptoate, Ethyl hexyl acetate, Ethyl isobutyrate, Ethyl laurate, Ethyl pelargonate, Ethyl phenoxy acetate, Ethyl phenyl acetate, Ethyl phenyl glycidate, Ethyl propionate, Ethyl safranate, Ethyl salicylate, Ethyl valerate, Eugenyl acetate, Evernyl, Fenchyl acetate, Floramat, Frescolat ML, Fructone, Fruitate, Geranyl acetate, Geranyl butyrate, Geranyl formate, Geranyl propionate, Geranyl tiglate, Givescone, Guaiol acetate, Hedionate, Hedione, Helvetolide, Herbanate, Hexyl acetate, Hexyl benzoate, n-Hexyl butyrate, Hexyl caproate, Hexyl isobutyrate, Hexyl propionate, Hexyl salicylate, Isobornyl acetate, Isobutyl acetate, Isobutyl phenyl acetate, Isobutyl salicylate, Isoeugenyl acetate, Isononyl acetate, Isopentyrate, Isopropyl 2-methyl butyrate, Isopropyl myristate, Jasmonyl, Liffarome, Linalyl acetate, Mahagonate, Manzanate, Menthanyl acetate, Menthyl acetate, Methyl benzoate, 2-Methyl butyl acetate, Methyl camomille, Methyl cinnamate, Methyl cyclogeranate, Methyl heptine carbonate, Methyl laurate, Methyl octine carbonate, Methyl phenyl acetate, Methyl salicylate, Methyl-2-methyl butyrate, Neofolione, Nopyl acetate, Octenyl acetate, Octyl acetate, Octyl isobutyrate, Para cresyl acetate, Para cresyl isobutyrate, Para cresyl phenyl acetate, Pear ester, Peranat, Phenoxy ethyl isobutyrate, Phenyl ethyl acetate, Phenyl ethyl butyrate, Phenyl ethyl formate, Phenyl ethyl isobutyrate, Phenyl ethyl phenyl acetate, Phenyl ethyl propionate, Phenyl ethyl salicylate, Phenyl ethyl tiglate, Phenyl propyl isobutyrate, Prenyl acetate, Romandolide, Sagecete, Styrallyl acetate, Styrallyl propionate, Tangerinol, Terpinyl acetate, Thesaron, Trans-2-hexenyl acetate, Tropicate, Verdox, Verdyl acetate, Verdyl propionate, Vertenex, Vetikol acetate, Vetiveryl acetate, Yasmolys.

Lactones such as: Ambrettolide, Arova N, Celeriax, Decalactone delta, Decalactone gamma, Dodecalactone delta, Dodecalactone gamma, Ethylene brassylate, Exaltolide, Heptalactone gamma, Hexalactone delta, Hexalactone gamma, Methyl laitone, Methyl octalactone, Nonalactone delta, Nonalactone gamma, Octahydrocoumarine, Octalactone delta, Octalactone gamma, Rootylone, Silvanone supra, Undecalactone delta, Undecalactone gamma, Valerolactone gamma, 10-Oxa-HexaDecanolide (OHD musk), Coumarin, Habanolide, Jasmolactone.

Aldehydes such as: Acetaldehyde, Adoxal, Aldehyde C10, Aldehyde C11 iso, Aldehyde C11 moa, Aldehyde C11 undecylenic, Aldehyde C11 undecylic, Aldehyde C12 lauric, Aldehyde C12 MNA, Anisaldehyde, Amyl cinnamaldehyde, Benzaldehyde, Bourgeonal, Campholenaldehyde, Cantonal, Cetonal, Cinnamic aldehyde, Cis-4-decenal, Cis-6-nonenal, Citral, Citronellal, Citronellyl oxyacetaldehyde, Cocal, Cuminaldehyde, Curgix, Cyclal C, Cyclamen aldehyde, Cyclomyral, Cyclovertal, Decenal 9, Dupical, Empetal, Ethyl vanillin, Floralozone, Florhydral, Geraldehyde, Helional, Heliotropin, Heptanal, Hexanal, Hexyl cinnamaldehyde, Hivernal neo, Hydratropaldehyde, Hydroxycitronellal, Intreleven aldehyde, Isobutavan, Isocyclocitral, Isovaleraldehyde, Lilial, Limonenal, Maceal, Mefranal, Melonal, Methyl cinnamaldehyde, Nonadien-al trans-2 cis-6, Nonanal, Octanal, Oncidal, Para tolyl aldehyde, Phenyl acetaldehyde, Phenyl propyl aldehyde, Precyclemone B, Safranal, Salicylaldehyde, Scentenal, Syringa aldehyde, Trans-4-decenal, Trans-2-dodecenal, Trans-2-hexenal, Trans-2-nonenal, Trifernal, Vanillin, Veratraldehyde, Vernaldehyde Ketones such as: Acetanisol, Acetoin, Acetophenone, Aldron, Allyl ionone, Benzophenone, Benzyl acetone, Calone, Camphor, Carvone d-, Carvone l-, Cashmeran, Cedryl methyl ketone, Cepionate, Claritone, Cosmone, Crysolide, Cyclotene, Damascenone, Damascone alpha, Damascone beta, Damascone delta, Damascone gamma, Diacetyl, Dihydro beta ionone, Dihydro isojasmonate, Dimethyl octenone, Dynascone, Ethyl amyl ketone, Ethyl maltol, Fenchone, Filbertone, Geranyl acetone, Globanone, Heptyl cyclopentanone, Ionone alpha, Ionone beta, Ionone pure, Iriswood, Irone alpha, Iso E Super, Isofenchone, Isojasmone T, Isolone K, Isomenthone, Isophorone, Jasmone cis-, Kambernoir, Kephalis, Koavone, Lavendinal, Maltol, Menthone, Methyl acetophenone, Methyl amyl ketone, Methyl heptenone, Methyl hexyl ketone, Methyl ionone gamma, Methyl naphthyl ketone beta, Methyl nonyl ketone, Muscenone, Muscone, Nectaryl, Orinox, OTBC Ketone, Para tertbutylcyclohexanone, Patchwood, Phantolid, Pharaone, Piperitone, Plicatone, Raspberry ketone, Raspberry ketone methyl ether, Safraleine, Spirogalbanone pure, Tonalid, Trimofix O, Veloutone, Vetikon.

Alcohols such as: Alcohol oxo C13, Amber core, Ambermax, Ambrinol, Amyl vinyl carbinol, Anisic alcohol, Bacdanol, Benzyl alcohol, Butanol, Cedrol crystals, Cinnamic alcohol, Citronellol, Coranol, Decanol, Dimethyl benzyl carbinol, Dimethyl octanol, Dimethyl phenyl ethyl carbinol, Dimetol, Fenchol, Hexanol, Isobornеol, Isobornyl cyclohexanol, Javanol, Keflorol, Kohinool, Lauryl alcohol, Lilyflore, Linalool oxide, Mayol, Menthol, Norlimbanol, Octanol, Osyrol, Para tertbutylcyclohexanol, Phenoxanol, Phenoxyethanol, Phenyl ethyl alcohol, Phenyl propyl alcohol, Propylene glycol, Rosaphen, Rose glycol, Styrallyl alcohol, Tricyclodecane dimethanol, Tetrahydro linalool, Tetrahydro myrcenol, Timberol, Undecavertol, Cis-3-hexenol, Citronellol laevo, Cyclofloranol, Dihydrolinalool, Dihydromyrcenol, Dimyrcetol, Ebanol, Geraniol, Isopulegol, Linalool, Nerol, Nerolidol, Nonadien-ol trans-2 cis-6, Polysantol, Rosalva, Sandalmysore core, Sandalore, Terpinen-4-ol, Terpineol, Trans-2-hexenol Phenols such as: Butylated hydroxyanisole, Dihydroeugenol, Dimethyl hydroquinone, Dimethyl resorcinol, Eugenol pure, Guaiacol, Isoeugenol, Meta cresol, Methyl diantilis, Para cresol, Propenyl guaethol, Thymol, Ultravanil.

Ethers such as: Ambroxan, Anethole, Anther, Benzyl isoamyl ether, Benzyl isopropyl ether, Benzyl isovalerate, Boisiris, Cedramber, Cetalox, Decyl methyl ether, Dibenzyl ether, Dihydro rose oxide, Diphenyl oxide, Doremox, Estragole, Ethyl linalool, Eucalyptol, Galaxolide, Gyrane, Herbavert, Lime oxide, Madrox, Methyl isoeugenol, Naphthyl isobutyl ether beta, Nerol oxide, Nerolin bromelia, Para cresyl butyl ether, Para cresyl methyl ether, Petiole, Phenyl ethyl methyl ether, Rhubafuran, Rose oxide, Rosyrane, Trisamber, Vetylbois K, Yara yara Acetals such as: Acetal CD, Acetal R, Amberketal, Boisambrene forte, Citrathal, 1,1-Diethoxyethane, Emeraldine, Freshopal, Herboxane, Indoflor, Jacinthaflor, Magnolan, Spirambrene, Viridine, Elintaal, Glycolierral, Karanal, Methyl pamplemousse, Hydrocarbons such as: Bisabolene, Camphene, Carene delta 3, Caryophyllene, Cedrene, Cymene para, Dipentene, Diphenyl methane, Isolongifolene, Limonene d-, Longifolene, Myrcene, Naphthalene, Ocimene, Pinene alpha, Pinene beta, Styrene, Terpinene gamma, Terpinolene, 1,3,5-Undecatriene, Verdoracine.

Sulphur compounds such as: Corps cassis, Dibutyl sulphide, Dimethyl sulphide, Exovert, Grapefruit thiol, Oxane, Ribes mercaptan, Sulfurol, Thiocineol.

Nitriles such as: Cinnamyl nitrile, Citronellyl nitrile, Citronitrile, Clonal, Cumin nitrile, Hexyl cyclopentanone, Irisnitrile, Lemonile, Peonile, Tridecyl nitrile, Agrumen nitrile, n-decyl nitrile.

Oximes such as: Buccoxime, Labienoxime, Stemone.

Nitrogen heterocycles such as: 2-acetylpyrazine, 2-acetylpyridine, sec-butylquinoline, Corps racine, 2-ethyl-3,5(or 6)-dimethylpyrazine, Furfuryl pyrrole, Indole, Isobutyl quinoline, 2-Isobutyl-3(or 6)-methoxypyrazine, Isopropyl quinoline, Maritima, p-methyl quinoline, Skatol, 2,3,5-trimethylpyrazine.

Nitro compound such as: Musk Ketone.

Schiff bases such as: Aurantiol, Helianthral, Ligantraal, Verdantiol.

Other materials such as: Acetanilide, Gardamide, Paradisamide, Dimethyl anthranilate, Methyl anthranilate, n-Butyric acid, Capric acid, Caproic acid, Caprylic acid, Phenylacetic acid, Caryophyllene oxide, Cedroxyde, Tobacarol.

The compounds of formula (I) can accordingly be used for the production of compositions and, as will be evident from the foregoing compilation, a wide range of known odorants/fragrance, flavor and/or deodorizing/masking materials. In the production of such compositions, the known fragrance, flavor and/or deodorizing/masking materials referred to earlier can be used according to methods which are known to the perfumer such as, for example, according to W. A. Poucher, Perfumes, Cosmetics and Soaps 2, 7th Edition, Chapman and Hall, London 1974.

In an embodiment of the present invention, the claimed fragrance, flavor and/or deodorizing/masking composition comprises in addition to the compound(s) of formula (I) at least one ester and/or one alcohol, preferably at least a mixture of ester and alcohol; the said ester and/or alcohol are preferably selected from the list defined herein above. In an embodiment of the present invention, the claimed odorant composition is characterised by a total content of the compound(s) of formula (I) together with the ester(s) and/or alcohol(s) which is superior to 25 wt %, preferably superior to 50 wt %, for example superior to 75 wt %, or even superior to 90 wt %.

Preparation

According to an embodiment of the present invention, the compounds of formula (I)

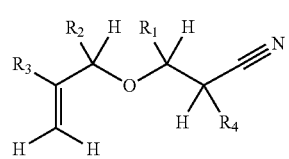

wherein $R_1$ is a hydrogen atom or a methyl group; $R_2$ is a hydrogen atom or is either an alkyl group having up to 9 carbon atoms or an alkenyl group containing up to 9 carbon atoms; $R_3$ is either an alkyl group having up to 9 carbon atoms or an alkenyl group containing up to 9 carbon atoms; $R_4$ is a hydrogen atom or a methyl group or an alkyl group having up to 9 carbon atoms or an alkenyl group containing up to 9 carbon atoms, can advantageously be prepared by reacting corresponding 2- and/or 1-substituted allyl alcohols of formula (II) with acrylonitrile, crotonitrile ((E)-but-2-enenitrile) or substituted 2-methylenenitriles

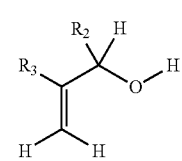

wherein in formula (II) $R_2$ is a hydrogen atom or is either an alkyl group having up to 9 carbon atoms or an alkenyl group containing up to 9 carbon atoms; $R_3$ is either an alkyl group having up to 9 carbon atoms or an alkenyl group containing up to 9 carbon atoms.

In an embodiment according to the present invention, $R_2$ can advantageously be straight chain and/or branched alkyls/alkenyls. In an embodiment according to the present invention, $R_3$ can advantageously be straight chain and/or branched alkyls/alkenyls.

The above reaction between formula (II) compounds and acrylonitrile or crotonitrile for the preparation of our compounds of formula (I) is preferably performed in the presence of a base (for example KOH) in water-methylene chloride mixture and a phase transfer catalyst selected from tetra-n-butyl ammonium bromide or 18-crown-6 $((C_2H_4O)_6)$; the reaction is advantageously performed at ambient temperature, preferably at a temperature comprised between 15° C. and 30° C., for example at 25° C.

The resulting 3-(2-methylenealkoxy)alkanenitrile derivatives of formula (I) are then preferably purified by distillation.

In an embodiment according to the present invention, the alcohols as defined in formula (II) can be advantageously synthesized from 2-substituted acroleins of formula (III); either by reduction, for example with sodium borohydride or lithium aluminum hydride or by nucleophilic addition of organometallic reagent, for example an appropriate alkyl magnesium halide, $R_2MgX$ e.g. MeMgCl;

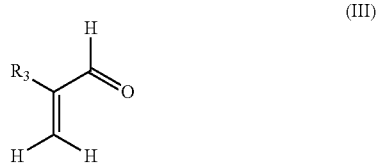

wherein in formula (III), $R_3$ is either an alkyl group having up to 9 carbon atoms (straight chain and/or branched alkyl) or an alkenyl group containing up to 9 carbon atoms (straight chain and/or branched alkyl).

In an embodiment according to the present invention, the acroleins of formula (III) can advantageously be synthesized via a reaction of an aldehyde of formula (IV) with formaldehyde (or a formaldehyde source);

wherein $R_3$ is either an alkyl group having up to 9 carbon atoms (straight chain and/or branched alkyl) or an alkenyl group having up to 9 carbon atoms (straight chain and/or branched alkyl).

For example, this reaction can advantageously be performed by using formaldehyde (e.g. 37% aqueous formaldehyde) or formaldehyde source (e.g. paraformaldehyde) and boric acid and secondary amine combination, for example the combination of boric acid and secondary amine such as diethanolamine. In an embodiment of the present invention, an acid base combination of 4-methoxybenzoic acid and di-n-butyl amine could also be used for the reaction of aldehydes with formaldehyde. The above reaction of aldehydes with formaldehyde results in formation of 2-substituted acroleins of formula (III) as defined above.

In an embodiment according to the present invention, the substituted-2-methylenenitriles (V) can be prepared in two steps, first by converting the substituted alpha-methylene aldehydes (III) into corresponding oximes (VI) and then dehydration.

Nitriles (V) prepared in 2 steps

Oximes (VI) made from 2-substituted acrolein (III): 2-Substituted nitriles were purchased from commercial source ($R_3$=H) and others were prepared as shown in below scheme.

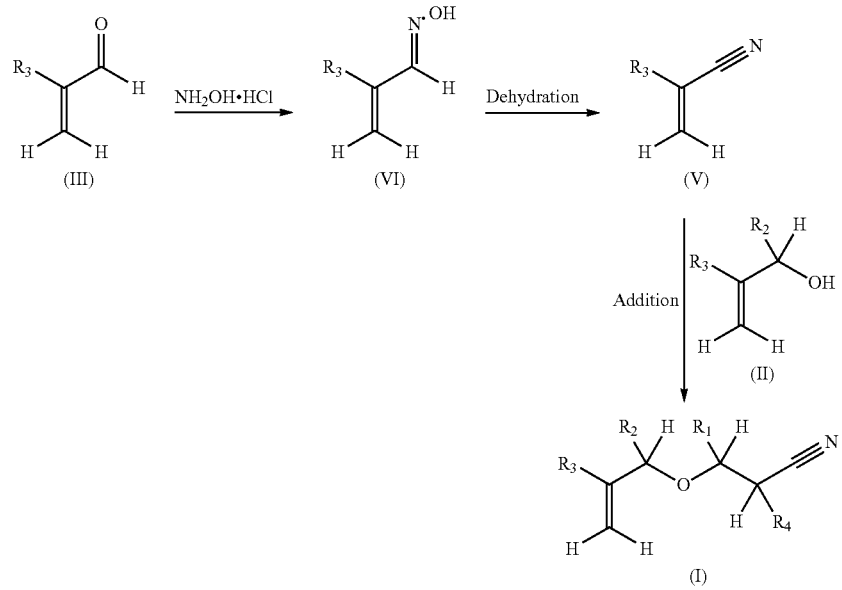

In an embodiment according to the present invention, the oximes as defined in formula (VI) can be advantageously synthesized from 2-substituted acroleins of formula (III) by subjecting it with hydroxylamine hydrochloride or hydroxylamine sulphate or hydroxylamine source in presence of base like sodium acetate, potassium acetate or sodium hydroxide in solvents like methanol or ethanol at room temperature or heating, e.g. at 60-100° C. for 4-10 hrs.

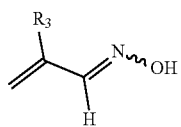

(VI)

wherein $R_3$ is either an alkyl group having up to 9 carbon atoms (straight chain and/or branched alkyl) or an alkenyl group having up to 9 carbon atoms (straight chain and/or branched alkenyl).

Subjecting the 2-substituted oximes of formula (VI) of the previous step to dehydration conditions like treating it with suitable dehydrating reagent like acetic anhydride at 110-140° C. for 6-8 hr to form the substituted 2-methylenenitriles of formula (V).

In an embodiment according to the present invention, the compounds of formula (I) can advantageously be prepared by the three following consecutive steps:

Subjecting an aldehyde of formula (IV)

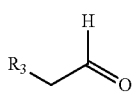

(IV)

wherein $R_3$ is either an alkyl group having up to 9 carbon atoms (straight chain and/or branched alkyl) or an alkenyl group having up to 9 carbon atoms (straight chain and/or branched alkyl),
to a reaction with formaldehyde to form 2-substituted acroleins of formula (III)

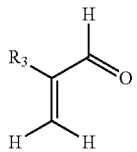

(III)

wherein $R_3$ is either an alkyl group having up to 9 carbon atoms (straight chain and/or branched alkyl) or an alkenyl group having up to 9 carbon atoms (straight chain and/or branched alkyl), Subjecting the 2-substituted acroleins of formula (III) of the previous step to a reduction or nucleophilic addition of organometallic reagent reaction step to form 2- and/or 1-substituted allyl alcohols of formula (II)

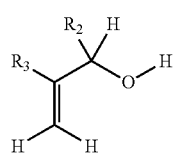

(II)

wherein $R_3$ is either an alkyl group having up to 9 carbon atoms (straight chain and/or branched alkyl) or an alkenyl group having up to 9 carbon atoms (straight chain and/or branched alkyl) and $R_2$ is a hydrogen atom or is either an alkyl group having up to 9 carbon atoms (straight chain and/or branched alkyl) or an alkenyl group having up to 9 carbon atoms (straight chain and/or branched alkyl); and Subjecting the 2- and/or 1-substituted allyl alcohols of formula (II) of the previous step to a reaction with substituted 2-methylenenitriles (V) to form the compounds of formula (I)

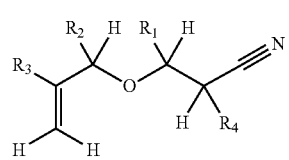

(I)

wherein $R_1$ is a hydrogen atom or a methyl group; $R_2$ is a hydrogen atom or is either an alkyl group having up to 9 carbon atoms or an alkenyl group containing up to 9 carbon atoms; $R_3$ is either an alkyl group having up to 9 carbon atoms or an alkenyl group containing up to 9 carbon atoms; $R_4$ is a hydrogen atom or a methyl group or an alkyl group having up to 9 carbon atoms or an alkenyl group containing up to 9 carbon atoms.

In an embodiment according to the present invention, $R_2$ can advantageously be straight chain and/or branched alkyls. In an embodiment according to the present invention, $R_3$ can advantageously be straight chain and/or branched alkyls/alkenyls. In an embodiment according to the present invention, $R_4$ can advantageously be straight chain and/or branched alkyls.

An illustrative scheme of the synthesis of the compounds of formula (I) according to the present invention is represented below

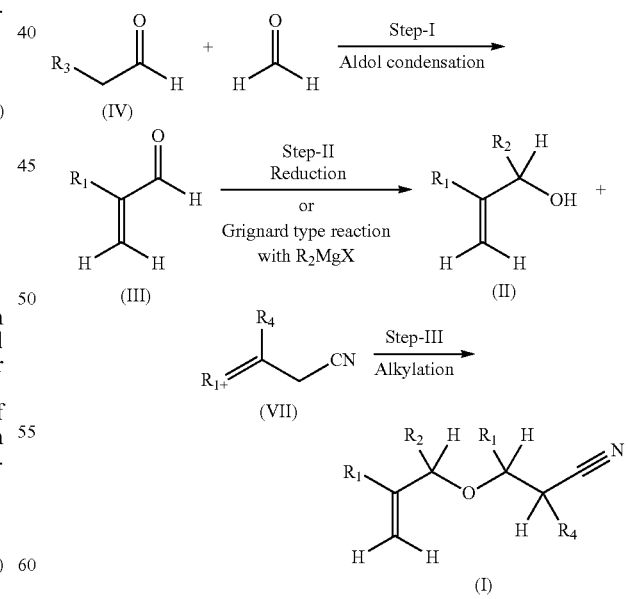

wherein, aldehydes of formula (IV) with two hydrogens in alpha position are converted into substituted acroleins (III) by reaction with formaldehyde (in form of paraformaldehyde or formalin); substituted acroleins (III) are either reduced with sodium borohydride or treated with Grignard reagents $R_2MgX$ to corresponding substituted allyl alcohols (II). Then these substituted allylic alcohols (II) are reacted with substituted 2-methylenenitriles (V or VII) in presence of KOH/tetra-n-butyl ammonium bromide in water at 25° C. to form the compounds of formula (I).

In an embodiment of the present invention, the aldol condensation, in particular the reaction of aldehydes with formaldehyde (first preparation step) is performed in the presence of a catalyst based on boric acid and a secondary amine, preferably diethanolamine. By developing this specific preparation step, the Applicants have significantly improved the overall preparation process thanks to low odor impact of the catalyst, e.g. when compared to other catalytic systems for aldol condensation which use strongly smelling amines like diethylamine, dibutyl amine, piperidine or pyrrolidine or unpleasantly smelling acids like fatty acids and low catalyst load when comparing to similar catalytic system like for instance dibuthyl amine/hexanoic acid or piperidine/stearic acid. Combination of availability, low cost of the components of the said catalytic system, and relatively low molecular mass of boric acid compared to other acids with similar pKa is particularly advantageous as it positively influences economic aspect of the methylenation process using the said catalytic system.

EXAMPLES

In an embodiment according to the present invention, the fragrance, flavor and/or deodorizing/masking compositions comprise compound or compounds of formula (II) which is/are selected from the following synthesized compounds given below. Odor description of compounds also given for each compound ND means not determined.

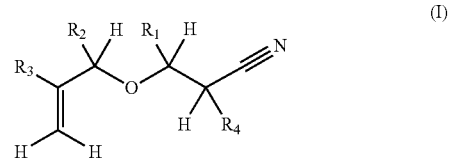

(I)

| Compound of formula (I) | Olfactory notes |
|---|---|
| Example 1: $R_1$, $R_2$, $R_4$ = H, $R_3$ = iPr | ND |
| Example 2: $R_1$ = Me, $R_2$ = Et, $R_3$ = iPr, $R_4$ = H | ND |
| Example 3: $R_1$, $R_2$, $R_4$ = H, $R_3$ = Et | ND |
| Example 4: $R_1$ = Me, $R_2$, $R_4$ = H, $R_3$ = Et | ND |
| Example 5: $R_1$, $R_4$ = H, $R_2$ = Me, $R_3$ = Et | ND |
| Example 6: $R_1$, $R_2$ = Me, $R_4$ = H, $R_3$ = Et | Dry note, nitrile like |
| Example 7: $R_1$, $R_4$ = H, $R_2$, $R_3$ = Et | ND |
| Example 8: $R_1$ = Me, $R_2$, $R_3$ = Et, $R_4$ = H | Earthy, dry note |
| Example 9: $R_1$, $R_2$, $R_4$ = H, $R_3$ = n-Pr | ND |
| Example 10: $R_1$, $R_4$ = H, $R_2$ = Me, $R_3$ = n-Pr | Dusty, woody, eathy, patchouli like. |
| Example 11: $R_1$, $R_2$ = Me, $R_3$ = n-Pr, $R_4$ = H | Dry, dusty, earthy, rooty. |
| Example 12: $R_1$, $R_4$ = H, $R_2$ = Et, $R_3$ = n-Pr | Dry, dusty note |
| Example 13: $R_1$, $R_2$, $R_4$ = H, $R_3$ = n-Bu | Strong dry woody, coriander, aldehydic, citrus, mandarin, pear, cinnamon, petal, floral. |
| Example 14: $R_1$ = Me, $R_2$, $R_4$ = H, $R_3$ = n-Bu | ND |
| Example 15: $R_1$, $R_4$ = H, $R_2$ = Et, $R_3$ = n-Bu | ND |
| Example 16: $R_1$ = Me, $R_2$ = Et, $R_3$ = n-Bu, $R_4$ = H | ND |
| Example 17: $R_1$, $R_2$, $R_4$ = H, $R_3$ = n-Pentyl | ND |
| Example 18: $R_1$ = Me, $R_2$, $R_4$ = H, $R_3$ = n-Pentyl | ND |
| Example 19: $R_1$, $R_4$ = H, $R_2$ = Me, $R_3$ = n-Pentyl | Dry, earthy, dusty note. |
| Example 20: $R_1$, $R_2$ = Me, $R_3$ = n-Pentyl, $R_4$ = H, | Dry, fishy, aqua, ozonic |
| Example 21: $R_1$, $R_4$ = H, $R_2$ = Et, $R_3$ = n-Pentyl | Dry, earthy, dusty note. |
| Example 22: $R_1$ = Me, $R_2$ = Et, $R_3$ = n-Pentyl, $R_4$ = H | ND |
| Example 23: $R_1$ = Me, $R_2$, $R_4$ = H, $R_3$ = n-Hexyl | ND |
| Example 24: $R_1$, $R_4$ = H, $R_2$ = Me, $R_3$ = n-Hexyl | ND |
| Example 25: $R_1$, $R_4$ = H, $R_2$ = Et, $R_3$ = n-Hexyl | ND |
| Example 26: $R_1$ = Me, $R_2$ = Et, $R_3$ = n-Hexyl, $R_4$ = H | ND |
| Example 27: $R_1$, $R_2$, $R_4$ = H, $R_3$ = n-Heptyl | ND |
| Example 28: $R_1$, $R_4$ = H, $R_2$ = Me, $R_3$ = n-Heptyl | Dry, fishy, ozonic |
| Example 29: $R_1$, $R_2$ = Me, $R_3$ = n-Heptyl, $R_4$ = H | ND |
| Example 30: $R_1$, $R_2$, $R_4$ = H, $R_3$ = non-1-ene | ND |
| Example 31: $R_1$ = Me, $R_2$, $R_4$ = H, $R_3$ = non-1-ene | ND |
| Example 32: $R_1$, $R_4$ = H, $R_2$ = iso-Bu, $R_3$ = n-Bu | ND |
| Example 33: $R_1$ = Me, $R_2$ = iso-Bu, $R_3$ = n-Bu, $R_4$ = H | ND |

-continued

| Compound of formula (I) | Olfactory notes |
|---|---|
| Example 34: $R_1$, $R_4$ = H, $R_2$, $R_3$ = n-Bu | ND |
| Example 35: $R_1$ = Me, $R_4$ = H, $R_2$, $R_3$ = n-Bu | Mild dry odour |
| Example 36: $R_1$, $R_2$ = H, $R_3$, $R_4$ = n-Bu | ND |
| Example 37: $R_1$, $R_2$ = H, $R_3$ = n-Bu, $R_3$ = n-Pr | ND |
| Example 38: $R_1$, $R_2$ = H, $R_3$ = n-Bu, $R_3$ = iPr | ND |
| Example 39: $R_1$, $R_2$ = H, $R_3$ = iPr, $R_3$ = n-Pr | ND |
| Example 40: $R_1$, $R_4$ = H, $R_2$ = allyl, $R_3$ = n-Bu | dry nitrile like, mild odour |
| Example 41: $R_1$ = Me, $R_2$ = allyl, $R_3$ = n-Bu, $R_4$ = H | ND |
| Example 42: $R_1$, $R_2$ = H, $R_3$ = n-Bu, $R_4$ = Et | ND |

Synthetic procedures and characterization data of some selected compounds are given below.

Example 1

Synthesis of 3-(3-methyl-2-methylenebutoxy)propanenitrile

Step 1: Synthesis of 3-methyl-2-methylenebutanal

3-Methylbutanal (200 g, 2.32 mol) was added to a mixture of aqueous (37%) formaldehyde (207 g, 2.55 mol), di-n-butylamine (15.0 g, 0.116 mol) and p-anisic acid (17.6 g, 0.116 mmol) at 25° C. over a period of 2 h and then the reaction mixture was heated at 70° C. for 4 h. The reaction mixture was cooled to 25° C. and the organic phase was separated, washed with water (3×100 mL) and dried over anhydrous sodium sulfate. The volatiles were removed and the resulting crude residue was distilled under reduced pressure (42-45° C./100 mbar) to afford 3-methyl-2-methylenebutanal (167 g, 73%) as a colorless liquid.
$^1$H NMR (400 MHz, CDCl$_3$): δ 9.45 (s, 1H), 6.17 (s, 1H), 5.89 (s, 1H), 2.71 (sep, J=6.8 Hz, 1H), 0.99 (d, J=6.8 Hz, 6H). $^{13}$C NMR (100 MHz, CDCl$_3$): δ 193.5, 155.5, 131.1, 25.1, 20.2.

Step 2: Synthesis of 3-methyl-2-methylenebutan-1-ol

Sodium borohydride (6.94 g, 183 mmol) was added to a stirred mixture of 3-methyl-2-methylenebutanal (60 g, 611 mmol) and water (300 ml) at 10-15° C. over a period of 15 min. The reaction mixture was then stirred for 3 h at 25° C. Subsequently, the reaction mixture was quenched with aqueous 10% hydrochloric acid (100 ml) and then extracted with MTBE (2×120 mL). The organic phase was separated and successively washed with water (150 mL), aqueous 10% sodium carbonate (150 ml) and brine (150 ml). The organic layer was dried over anhydrous sodium sulfate and concentrated under reduced pressure to afford 3-methyl-2-methylenebutan-1-ol which was used as such in the next step.

Step 3: Synthesis of 3-(3-methyl-2-methylenebutoxy)propanenitrile

To a mixture of 3-methyl-2-methylenebutan-1-ol (20 g, 200 mmol) and 18-crown-6 (1.056 g, 3.99 mmol) in dichloromethane (100 ml) was added a solution of potassium hydroxide (16.80 g, 300 mmol) in water (40 ml). Acrylonitrile (15.89 g, 300 mmol) was then added over a period of 30 min. The reaction mixture was stirred at 25° C. for 15 h. The reaction mixture was acidified by dil. HCl till pH 3-4. The organic layer was separated and the aqueous layer was extracted with methyl tertiary butyl ether (MTBE, 2×50 ml). The combined organic layer was successively washed with water (40 ml) and brine (40 ml) and the volatiles were removed under reduced pressure. The residue was purified by distillation (110-112° C./5 mbar) to afford 3-((3-methylenepentan-2-yl)oxy)propanenitrile (12.0 g, 38%) as a colorless liquid.
Odor Note: ND
$^1$H NMR (400 MHz, CDCl$_3$): δ 5.01 (s, 1H), 4.96 (s, 1H), 4.03 (s, 2H), 3.63 (t, J=6.4 Hz, 2H), 2.62 (t, J=6.4 Hz, 2H), 2.35 (sep, J=6.4 Hz, 1H), 1.07 (t, J=7.2 Hz, 6H). $^{13}$C NMR (100 MHz, CDCl$_3$) δ 151.2, 117.5, 109.9, 73.3, 64.4, 30.1, 21.3, 19.1.

Example 2

Synthesis of 3-((5-methyl-4-methylenehexan-3-yl)oxy)butanenitrile

To a mixture of 5-methyl-4-methylenehexan-3-ol (15 g, 117 mmol), KOH (7.22 g, 129 mmol), tetra-n-butyl ammonium bromide (1.886 g, 5.85 mmol) in water (15 mL) at 25° C. was added a solution of (E)-but-2-enenitrile (crotonitrile) (11.77 g, 175 mmol) in dichloromethane (15 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml), brine (20 ml) and the volatiles were removed under reduced pressure. The resulting residue was purified by distillation (67° C./3 mbar) to afford 3-((5-methyl-4-methylenehexan-3-yl)oxy)butanenitrile (12 g, 52%) as an inseparable mixture of diastereomers.
Odor Note: ND
$^1$H NMR (300 MHz, CDCl$_3$): δ 5.02-4.97 (m, 2H), 3.73-3.64 (m, 2H), 2.52-2.44 (m, 2H), 2.23 (sept, J=6.9 Hz, 1H), 1.60-1.50 (m, 2H), 1.32-1.25 (m, 3H), 1.05 (t, J=6.9 Hz, 6H), 0.90 (t, J=7.8 Hz, 3H).

Example 3

Synthesis of 3-(2-methylenebutoxy)propanenitrile

Step 1: Synthesis of 2-methylenebutanal

A mixture of n-butyraldehyde (100.0 g, 1.38 mmol), boric acid (0.85 g, 13.87 mmol), formaldehyde (45.8 g, 1.52 mmol) and diethanolamine (15.58 g, 0.14 mmol) was stirred at 32° C. for 18 h. The reaction mixture was quenched with dilute HCl (50 ml) followed by washing with aqueous sodium carbonate solution (50 ml). The organic layer was extracted with ethyl acetate (3×100 ml). The combined organic layer was washed with brine (100 ml), dried over anhydrous sodium sulfate and the resulting solution was concentrated under reduced pressure. The resulting residue was purified by distillation to afford 2-methylenebutanal (60.0 g, 51%) as a colourless liquid.

$^1$H NMR (400 MHz, CDCl$_3$): δ 9.45 (s, 1H), 6.15 (s, 1H), 5.89 (s, 1H), 2.18-2.12 (m, 2H), 0.96 (t, J=7.6 Hz, 3H). $^{13}$C NMR (75 MHz, CDCl$_3$): δ 194.7, 151.7, 133.1, 20.8, 11.8.

Step 2: Synthesis of 2-methylenebutan-1-ol

Sodium borohydride (2.06 g, 57.7 mmol) was added to a stirred mixture of 2-methylenebutanal (23 g, 273 mmol) and water (30 ml) at 10-15° C. over a period of 15 min. The reaction mixture was then stirred for 3 h at 25° C. Subsequently, the reaction mixture was quenched with aqueous 10% hydrochloric acid (60 ml). The organic phase was separated and was successively washed with water (60 mL), aqueous 10% sodium carbonate (60 ml) and brine (60 ml). The organic layer was dried over anhydrous sodium sulfate and concentrated under reduced pressure to afford 2-methylenebutan-1-ol which was used as such in the next step.

$^1$H NMR (300 MHz, CDCl$_3$): δ 5.00 (s, 1H), 4.87 (s, 1H), 4.08 (s, 2H), 2.09 (q, J=7.5 Hz, 2H), 1.89 (br s, 1H), 1.07 (t, J=7.5 Hz, 3H). $^{13}$C NMR (75 MHz, CDCl$_3$): δ 150.8, 108.0, 65.9, 25.7, 12.2.

Step-3: Synthesis of 3-(2-methylenebutoxy)propanenitrile

To a mixture of 2-methylenebutan-1-ol (15.0 g, 174 mmol), KOH (10.75 g, 192 mmol), tetra-n-butyl ammonium bromide (2.80 g, 8.71 mmol) in water (30 ml) at 25° C. was added a solution of acrylonitrile (13.86 g, 261 mmol) in dichlromethane (15 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation to afford pure 3-(2-methylenebutoxy)propanenitrile (9.0 g, 37%) as a colourless liquid.

Odor Note: ND $^1$H NMR (400 MHz, CDCl$_3$): δ 4.74 (s, 1H), 4.67 (s, 1H), 3.72 (s, 2H), 3.35 (t, J=6.4 Hz, 2H), 2.35 (t, J=6.4 Hz, 2H), 1.81 (q, J=7.6 Hz, 2H), 0.80 (t, J=7.6 Hz, 3H). $^{13}$C NMR (100 MHz, CDCl$_3$): δ 146.9, 117.9, 111.0, 74.3, 65.2, 25.7, 18.8, 11.9.

Example 8

Synthesis of 3-((4-methylenehexan-3-yl)oxy)butanenitrile

To a mixture of 4-methylenehexan-3-ol (4.0 g, 35.03 mmol), KOH (1.9 g, 33.86 mmol), water (10 mL) and 18-Crown-6 (0.18 g, 0.68 mmol) at 25° C. was added a solution of (E)-but-2-enenitrile (2.8 g, 41.73 mmol) in dichlromethane (7 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation to afford 3-((4-methylenehexan-3-yl)oxy)butanenitrile (2.8 g, 50%) as a colourless liquid.

Odor Note: Earthy, dry note.

$^1$H NMR (300 MHz, CDCl$_3$): δ 4.98 (s, 1H), 4.93 (s, 1H), 3.76-3.65 (m, 2H), 2.54-2.45 (m, 2H), 2.15-1.90 (m, 2H), 1.65-1.49 (m, 2H), 1.33-1.24 (m, 3H), 1.07 (t, J=7.2 Hz, 3H), 0.87 (t, J=7.5 Hz, 3H).

Example 9

Synthesis of 3-((2-methylenepentyl)oxy)propanenitrile

Step 1: Synthesis of 2-methylenepentanal

A 250 mL round bottom flask fitted with a reflux condenser was charged with di-n-butylamine (1.88 g, 14.51 mmol), acetic acid (1.66 ml, 29.0 mmol) and aqueous formaldehyde (25.9 ml, 37% solution in water, 348 mmol). The resulting solution was heated to 50° C. with stirring for 10 min. Then n-pentanal (25.0 g, 290 mmol) was added over 1 h. A slight exotherm was observed during addition. After stirring the reaction mixture at 50° C. for 16 h, the reaction mixture was cooled to 25° C. The reaction mixture was washed with 5% HCl (3×20 ml). The organic layer was then washed with saturated sodium bicarbonate (30 ml), dried over anhydrous sodium sulfate and concentrated under reduced pressure. The resulting crude product was purified by distillation under reduced pressure (50-54° C./3 mbar) to afford 2-methylenepentanal (10.0 g, 35%) as a colourless liquid.

$^1$H NMR (400 MHz, CDCl$_3$): δ 9.47 (s, 1H), 6.18 (s, 1H), 5.93 (s, 1H), 2.15 (t, J=7.6 Hz, 2H), 1.46-1.36 (m, 2H), 0.86 (t, J=7.6 Hz, 3H). $^{13}$C NMR (100 MHz, CDCl$_3$): δ 198.0, 150.0, 134.2, 29.7, 21.0, 15.2.

Step 2: Synthesis of 2-methylenepentan-1-ol

Sodium borohydride (1.16 g, 30.6 mmol) was added to a stirred mixture of 2-methylenepentanal (10.0 g, 102 mmol) and water (15 mL) at 10-15° C. over a period of 15 min. The reaction mixture was then stirred for 3 h at 25° C. Subsequently, the reaction mixture was quenched with aqueous 10% hydrochloric acid (20 ml). The organic phase was separated and was successively washed with water (25 mL), aqueous 10% sodium carbonate (25 ml) and brine (25 ml). The organic layer was dried over anhydrous sodium sulfate and concentrated under reduced pressure to afford of 2-methylenepentan-1-ol which was used as such in the next step.

Step 3: Synthesis of 3-((2-methylenepentyl)oxy)propanenitrile

To a mixture of 3-methyl-2-methylenebutan-1-ol 2-methylenepentan-1-ol (20.0 g, 199.7 mmol), KOH (12.32 g, 219.57 mmol), tetra-n-butyl ammonium bromide (3.22 g, 9.98 mmol) in water (30 mL) at 25° C. was added a solution of acrylonitrile (15.97 g, 19.72 mL, 301 mmol) in dichlromethane (15 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (30 ml) and brine (30 ml) and the volatiles were removed under reduced pressure. The residue was purified by distillation (56-60° C. at 3 mbar) to afford pure 3-((2-methylenepentyl)oxy)propanenitrile (13.8 g, 45%) as a colorless liquid.

Odor Note: ND $^1$H NMR (400 MHz, CDCl$_3$): δ 5.03 (s, 1H), 4.90 (s, 1H), 3.98 (s, 2H), 3.64 (t, J=6.4 Hz, 2H), 2.63 (t, J=6.4 Hz, 2H), 2.05 (t, J=7.6 Hz, 2H), 1.54-1.45 (m, 2H), 0.94 (t, J=7.2 Hz, 3H). $^{13}$C NMR (100 MHz, CDCl$_3$): δ 145.2, 118.0, 112.4, 74.0, 64.4, 35.6, 20.4, 19.1, 13.8.

Example 10

Synthesis of 3-((3-methylenehexan-2-yl)oxy)propanenitrile

Step 1: Synthesis of 3-methylenehexan-2-ol

To a cooled (0° C.) solution of 2-methylenepentanal (30 g, 306 mmol) in THF (120 ml) was slowly added a solution of methyl magnesium chloride (153 ml, 3 M in tetrahydrofuran, 459 mmol). The reaction mixture was stirred at RT for 4 h. After completion of reaction, the reaction mixture was quenched with ammonium chloride solution (50 ml). The solution was extracted with ethyl acetate (3×50 ml). The combined organic layer was dried over sodium sulphate, concentrated under reduced pressure. The crude product was distilled to give 3-methylenehexan-2-ol (20 g, 57%).

$^1$H NMR (400 MHz, CDCl$_3$): δ 4.97 (s, 1H), 4.73 (s, 1H), 4.17 (q, J=6.4 Hz, 1H), 2.04-1.88 (m, 2H), 1.84 (s, 1H), 1.47-1.38 (m, 2H), 1.21 (d, J=6.4 Hz, 3H), 0.86 (t, J=7.2 Hz, 3H), $^{13}$C NMR (100 MHz, CDCl$_3$): δ 153.2, 108.3, 70.6, 33.2, 21.9, 21.3, 13.9.

Step 2: Synthesis of 3-((3-methylenehexan-2-yl)oxy)propanenitrile

To a mixture of 3-methylenehexan-2-ol (10.0 g, 88 mmol), KOH (5.40 g, 96 mmol) and tetra-n-butylammonium bromide (1.41 g, 4.38 mmol) in water (15 mL) at 25° C. was added a solution of acrylonitrile (8.65 ml, 131 mmol) in dichloromethane (10 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (40 mL). The combined organic layer was successively washed with water (30 mL) and brine (30 mL). The volatiles were removed under reduced pressure and the resulting residue was distilled under reduced pressure (65-67° C. at 3 mbar) to afford 3-((3-methylenehexan-2-yl)oxy)propanenitrile (8.0 g, 54%) as a colourless liquid.

Odor Note: Dusty, woody, earthy, pathouli like.

$^1$H NMR (400 MHz, CDCl$_3$): δ 4.93 (s, 1H), 4.83 (s, 1H), 3.82-3.78 (m, 1H), 3.56-3.50 (m, 1H), 3.42-3.36 (m, 1H), 2.50 (t, J=6.4 Hz, 2H), 1.91 (t, J=8 Hz, 2H), 1.48-1.37 (m, 2H), 1.20 (d, J=6.4 Hz, 3H), 0.88 (t, J=7.2 Hz, 3H). $^{13}$C NMR (100 MHz, CDCl$_3$): δ 149.4, 118.0, 112.1, 80.0, 62.7, 32.4, 20.7, 20.3, 18.8, 14.0.

Example 11

Synthesis of 3-((3-methylenehexan-2-yl)oxy)butanenitrile

To a mixture of KOH (5.40 g, 96 mmol) and tetra-n-butylammonium bromide (1.41 g, 4.38 mmol) in water was added 3-methylenehexan-1-ol (10.0 g, 88 mmol) at 30° C. in 15 min and then to it was added a solution of (E)-but-2-enenitrile (8.81 g, 131 mmol) in dichloromethane (10 mL) over 30 min at 30° C. The reaction mixture was stirred at 25° C. for 15 h. The reaction mixture was acidified by dil. HCl till pH 3-4. The organic layer was separated and the aqueous layer was extracted with diethyl ether (40 mL). The combined organic layer was successively washed with water and brine. The volatiles were removed under reduced pressure. The crude product was purified by fractional distillation under reduced pressure (71-74° C. at 3 mbar) to afford pure product (E)-but-2-enenitrile (8.81 g, 50%) as a colourless liquid.

Odor Note: Dry, dusty, earthy, rooty.

Example 12

Synthesis of 3-((4-methyleneheptan-3-yl)oxy)propanenitrile

Step 1: Synthesis of 4-methyleneheptan-3-ol

2-Methylenepentanal (40 g, 408 mmol) was taken in THF (120 ml) and cooled to 0° C., to this cold solution ethyl magnesium chloride (245 ml, 2 M solution in THF, 489 mmol) was added over a period of 15 min. The reaction mixture was stirred at RT for 4 h. Then the reaction mixture was quenched with saturated ammonium chloride solution (50 mL) and the mixture was extracted with ethyl acetate (3×100 ml). The organic layer was dried over sodium sulfate and concentrated under reduced pressure. The crude product was purified by distillation under reduced pressure (40° C. at 3 mbar) to afford 4-methyleneheptan-3-ol (14 g, 26%) as colourless liquid.

$^1$H NMR (400 MHz, CDCl$_3$): δ 5.01 (s, 1H), 4.85 (s, 1H), 4.0 (t, J=6.4 Hz, 1H), 2.09-1.68 (m, 2H), 1.66-1.43 (m, 4H), 0.96-0.89 (m, 6H). $^{13}$C NMR (100 MHz, CDCl$_3$): δ 150.6, 108.4, 75.7, 33.1, 27.3, 20.1, 12.8, 9.6.

Step 2: Synthesis of 3-((4-methyleneheptan-3-yl)oxy)propanenitrile

To a mixture of 4-methyleneheptan-3-ol (7 g, 54.6 mmol), KOH (3.37 g, 60.1 mmol) and tetra-n-butylammonium bromide (0.88 g, 2.73 mmol) in water (20 mL) at 25° C. was added a solution of acrylonitrile (5.39 ml, 82 mmol) in dichloromethane (8 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (40 mL). The combined organic layer was successively washed with water and brine. The volatiles were removed under reduced pressure and the resulting residue was distilled under reduced pressure (74-76° C. at 3 mbar) to afford 3-((4-methyleneheptan-3-yl)oxy)propanenitrile (6.0 g, 60%) as colourless liquid.

Odor Note: Dry dusty note.

$^1$H NMR (400 MHz, CDCl$_3$): δ 4.91-(s, 1H), 4.88-4.87 (m, 1H), 3.60-3.49 (m, 2H), 3.39-3.32 (m, 1H), 2.50 (t, J=6.4 Hz, 2H), 1.89-1.83 (m, 2H), 1.60-1.42 (m, 4H), 0.87 (t, J=7.2 Hz, 3H), 0.82 (t, J=7.2 Hz, 3H). $^{13}$C NMR (100 MHz, CDCl$_3$): δ 147.9, 118.1, 112.2, 86.3, 62.8, 32.1, 26.9, 18.8, 13.8, 10.2.

Example 13

Synthesis of 3-((2-methylenehexyl)oxy)propanenitrile

Step 1: Synthesis of 2-methylenehexanal n-Hexanal (3.88 kg, 38.7 mol, 1 equiv) was added to a mixture of aqueous 37% formaldehyde (3.7 kg, 46.5 mol, 1.2 equiv), di-n-butylamine (252 g, 1.95 mol, 0.05 equiv) and p-anisic acid (295 g, 1.9 mol, 0.05 equiv) at 10-15° C. over a period of 2 h while stirring. After completion of addition, the reaction mixture was stirred for 2 h at 50° C. Subsequently, the reaction mixture was cooled to 25° C. The organic phase was separated, washed with water (3×2 L) and dried over anhydrous sodium sulfate (250 g). The crude product was distilled (45-49° C./53 mbar) to afford 2-methylenehexanal (3.98 kg, 91%) as a colorless liquid.

¹H NMR (400 MHz, CDCl₃): δ 9.45 (s, 1H), 6.17 (s, 1H), 5.91 (s, 1H), 2.17-2.13 (m 2H), 1.38-1.20 (m, 4H), 0.82 (t, J=7.2 Hz, 3H). ¹³C NMR (100 MHz, CDCl₃): δ 194.5, 150.5, 133.7, 29.9, 27.3, 22.0, 13.6.

Step 2: Synthesis of 2-methylenehexan-1-ol

Sodium borohydride (383 g, 10.1 mol, 0.272 equiv) was added to a mixture of 2-methylenehexanal (4.18 kg, 37.3 mol, 1 equiv) and water (5.60 L) at 10-15° C. over a period of 4 h while stirring. Then the reaction mixture was stirred for 3 h at 25° C. Subsequently, the reaction mixture was quenched with aqueous hydrogen chloride (10%, 3 L). The organic phase was separated and was successively washed with water (3 L), aqueous 10% sodium carbonate (3 L) and brine (3 L). The organic phase (4.13 kg) was distilled under reduced pressure (52-54° C./4 mbar) to afford 2-methylenehexan-1-ol (3.94 kg, 92%) as a colorless liquid.

¹H NMR (400 MHz, CDCl₃): δ 5.00 (m, 1H), 4.86-4.85 (m, 1H), 4.05 (s, 2H), 2.07-2.03 (m, 3H), 1.47-1.30 (m, 4H), 0.91 (t, J=7.2 Hz, 3H). ¹³C NMR (100 MHz, CDCl₃): δ 149.0, 108.6, 65.4, 35.6, 32.8, 22.6, 13.8.

Step 3: Synthesis of 3-((2-methylenehexyl)oxy)propanenitrile

To a mixture of 2-methylenehexan-1-ol (250 g, 2.06 mol), potassium hydroxide (127 g, 2.26 mol) and tetra-n-butyl ammonium bromide (33.2 g, 0.10 mol) in water (375 mL) at 25° C. was added acrylonitrile (164.0 g, 3.08 mmol) over a period of 2 h. The reaction mixture was stirred at 25° C. for 5 h. The reaction mixture was acidified with di. HCl till pH 3-4. The organic layer was successively washed with water (3×200 mL) and brine (2×200 mL). The residue (315 g) was distilled under reduced pressure (85-90° C./3 mbar) to afford 3-((2-methylenehexyl)oxy)propanenitrile (256 g, 70%) as a colorless liquid.

Odor Note: Strong woody, coriander, aldehydic, citrus, mandarin, pear, cinnamon, petal floral.

¹H NMR (400 MHz, CDCl₃): 4.98 (s, 1H), 4.89 (s, 1H), 3.94 (s, 2H), 3.58 (t, J=6.0 Hz, 2H), 2.58 (t, J=6.0 Hz, 2H), 2.02 (t, J=7.6 Hz, 2H), 1.44-1.25 (m, 4H), δ 0.88 (t, J=7.6 Hz, 3H).

¹³C NMR (100 MHz, CDCl₃): δ 145.4, 117.9, 111.8, 74.0, 64.5, 32.6, 29.5, 18.8, 16.0, 14.0.

Example 14

Synthesis of 3-((2-methylenehexyl)oxy)butanenitrile

To a mixture of 2-methylenehexan-1-ol (15 g, 131 mmol), potassium hydroxide (8.11 g, 144 mmol) and tetra-n-butyl ammonium bromide (2.11 g, 6.57 mmol) in water (32 ml) at 25° C. was added a solution of (E)-but-2-enenitrile (13.22 g, 197 mmol) in dichloromethane (15 mL) over a period of 30 min. The reaction mixture was stirred at 25° C. for 28 h. The reaction mixture was acidified with di. HCl till pH 3-4. The organic layer was separated and then successively washed with water (40 mL), brine (40 mL) and concentrated. The residue was distilled under reduced pressure (88-90° C./3 mbar) to afford 3-((2-methylenehexyl)oxy)butanenitrile (16.9 g, 71%) as a colorless liquid.

Odor Note: ND

¹H NMR (400 MHz, CDCl₃): δ 4.95 (s, 1H), 4.83 (s, 1H), 3.90 (d, J=12.4 Hz, 1H), 3.85 (d, J=12.4 Hz, 1H), 3.72-3.65 (m, 1H), 2.45 (d, J=5.6 Hz, 2H), 2.01-1.96 (m, 2H), 1.40-1.31 (m, 2H), 1.28-1.21 (m, 5H), 0.84 (t, J=7.2 Hz, 3H). ¹³C NMR (100 MHz, CDCl₃): δ 145.8, 117.6, 111.6, 71.8, 70.2, 31.2, 29.6, 25.3, 23.1, 18.7, 14.4.

Example 15

Synthesis of 3-((4-methyleneoctan-3-yl)oxy)propanenitrile

A solution of 4-methyleneoctan-3-ol (15.0 g, 105 mmol), potassium hydroxide (7.69 g, 137 mmol) and tetra-n-butylammonium bromide (1.7 g, 5.27 mmol) in water (60 ml) was stirred for 30 min at room temperature. Then a solution of acrylonitrile (7.27 g, 137 mmol) in dichloromethane (10 mL) was slowly added to the above mixture and the reaction was continued at RT for 16 hrs. The reaction mixture was acidified with di. HCl till pH 3-4. The organic layer was separated and washed with water (20 ml), dried over anhydrous sodium sulfate and concentrated. The residue was distilled under reduced pressure (82° C. and 3 mbar) to give 3-((4-methyleneoctan-3-yl)oxy)propanenitrile (11.5 g, 55%) as a colorless liquid.

Odor Note: ND

¹H NMR (300 MHz, CDCl₃): δ 4.97-4.93 (m, 2H), 3.66-3.55 (m, 2H), 3.46-3.38 (m, 1H), 2.55 (t, J=6.3 Hz, 2H), 1.98-1.91 (m, 2H), 1.62-1.31 (m, 6H), 0.94-0.86 (m, 6H). ¹³C NMR (75 MHz, CDCl₃): δ 148.1, 118.0, 111.9, 62.8, 29.9, 29.6, 26.9, 22.6, 18.9, 86.3, 13.9, 10.2.

Example 16

Synthesis of 3-((4-methyleneoctan-3-yl)oxy)butanenitrile

To a solution of 4-methyleneoctan-3-ol (15.0 g, 105 mmol) and tetra-n-butylammonium bromide (1.70 g, 5.27 mmol) in dichloromethane (36 ml) was slowly added a solution of potassium hydroxide (7.69 g, 137 mmol) dissolved in water (9 ml) and the reaction mixture was stirred for 15 min. Then crotonitrile (8.49 g, 127 mmol) was added to the above mixture over 30 min. After completion of reaction, the reaction mixture was acidified with dil HCl (pH~3-4) and the organic layer was separated. The organic layer was washed with water (40 ml), dried and concentrated. The crude material was purified under reduced pressure (87° C./3 mbar) to afford 3-((4-methyleneoctan-3-yl)oxy)butanenitrile (18.5 g, 84%) as an inseparable mixture of diastereomers.

Odor Note: ND

¹H NMR (300 MHz, CDCl₃): δ 4.97 (s, 1H), 4.91 (s, 1H), 3.72-3.64 (m, 2H), 2.48-2.43 (m, 2H), 2.05-1.94 (m, 2H), 1.56-1.30 (m, 6H), 1.26 (t, J=6.6 Hz, 3H), 0.94-0.84 (m, 6H).

Example 17

Synthesis of 3-((2-methyleneheptyl)oxy)propanenitrile

Step 1: Synthesis of 2-methyleneheptanal

Heptanal (160 g, 1.40 mol) was added to a mixture of aqueous (37%) formaldehyde (136 g, 1.68 mol), di-n-butylamine (9.06 g, 0.07 mol) and acetic acid (8.02 mL, 0.14 mol) at 25° C. over a period of 30 min and then the reaction mixture was heated at 60° C. for 4 h. The reaction mixture was cooled to 25° C. and the organic phase was separated, successively washed with aqueous NaHCO₃ (50 mL), water (50 mL) and dried over anhydrous sodium sulfate. The volatiles were removed under reduced pressure to afford 2-methyleneheptanal (145 g, 1.15 mol, 82%) as a colourless liquid. The crude product was used as such for further reaction.

¹H NMR (400 MHz, CDCl₃): δ 9.46 (s, 1H), 6.18 (s, 1H), 5.92 (s, 1H), 2.16 (t, J=7.2 Hz, 2H), 1.41-1.34 (m, 2H), 1.30-1.19 (m, 4H), 0.81 (t, J=7.2 Hz, 3H). ¹³C NMR (100 MHz, CDCl₃): δ 194.8, 150.4, 133.9, 31.4, 27.7, 27.4, 22.2, 13.9.

Step 2: Synthesis of 2-methyleneheptan-1-ol

Sodium borohydride (5.40 g, 0.143 mol) was added to a stirred mixture of 2-methyleneheptanal (45 g, 0.36 mol) and water (120 mL) at 10-15° C. over a period of 15 min. The reaction mixture was then stirred for 3 h at 25° C. Subsequently, the reaction mixture was quenched with aqueous 10% hydrochloric acid (50 ml). The organic phase was separated and the aqueous layer was extracted with MTBE (2×50 mL). The combined organic layer was successively washed with water (50 mL), aqueous 10% sodium carbonate (50 ml) and brine (50 ml). The organic layer was dried over anhydrous sodium sulfate and concentrated under reduced pressure to afford 2-methyleneheptan-1-ol (42 g, 92%) which was used as such in the next step.

¹H NMR (400 MHz, CDCl₃): δ 4.99 (s, 1H), 4.84 (s, 1H), 4.04 (s, 2H), 2.56 (br s, 1H), 2.03 (t, J=7.6 Hz, 2H), 1.48-1.40 (m, 2H), 1.37-1.23 (m, 4H), 0.89 (t, J=7.2 Hz, 3H). ¹³C NMR (100 MHz, CDCl₃): δ 149.2, 108.8, 65.7, 32.9, 31.4, 27.6, 22.6, 14.0.

Step 3: Synthesis of 3-((2-methyleneheptyl)oxy)propanenitrile

To a mixture of 2-methyleneheptan-1-ol (14 g, 109.19 mmol), KOH (7.35 g, 131 mmol), tetra-n-butyl ammonium bromide (1.76 g, 5.46 mmol) in water (30 mL) at 25° C. was added acrylonitrile (8.73 g, 10.78 mL, 16.46 mmol) over a period of 20 min. The reaction mixture was stirred at 25° C. for 15 h. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation (90° C./4 mbar) to afford 3-((2-methyleneheptyl)oxy)propanenitrile (5.2 g, 30%) as a colourless liquid.

Odor Note: ND

¹H NMR (400 MHz, CDCl₃): δ 5.02 (s, 1H), 4.95 (s, 1H), 3.98 (s, 2H), 3.64 (t, J=6.4 Hz, 2H), 2.63 (t, J=6.4 Hz, 2H), 2.06 (t, J=8.0 Hz, 2H), 1.50-1.45 (m, 2H), 1.45-1.25 (m, 4H), 0.91 (t, J=6.8 Hz, 3H). ¹³C NMR (100 MHz, CDCl₃): δ 145.5, 117.9, 111.9, 73.8, 64.4, 32.7, 31.5, 27.3, 22.6, 18.8, 13.8.

Example 18

Synthesis of 3-((2-methyleneheptyl)oxy)butanenitrile

To a mixture of 2-methyleneheptan-1-ol (12 g, 93.58 mmol), KOH (7.88 g, 140.4 mmol), tetra-n-butyl ammonium bromide (1.51 g, 4.68 mmol) in water (30 mL) at 25° C. was added (E)-but-2-enenitrile (8.16 g, 9.91 mL, 121.7 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation (92° C./3 mbar) to afford 3-((2-methyleneheptyl)oxy)butanenitrile (3.7 g, 20%) as a colourless liquid.

Odor Note: ND

¹H NMR (400 MHz, CDCl₃): δ 5.01 (s, 1H), 4.90 (s, 1H), 3.97, 3.92 (ABq, J_{AB}=12.4 Hz, 2H), 3.79-3.72 (m, 1H), 2.52 (d, J=5.6 Hz, 2H), 2.05 (t, J=7.6 Hz, 2H), 1.48-1.40 (m, 2H), 1.43-1.23 (overlapped signals, 7H), 0.89 (t, J=6.8 Hz, 3H). ¹³C NMR (100 MHz, CDCl₃): δ 145.8, 117.4, 111.9, 71.8, 70.6, 32.8, 31.8, 27.6, 25.6, 22.6, 19.5, 14.2.

Example 19

Synthesis of 3-((3-methyleneoctan-2-yl)oxy)propanenitrile

Step 1: Synthesis of 3-methyleneoctan-2-ol

To a solution of 2-methyleneheptanal (45 g, 357 mmol) in tetrahydrofuran (120 ml) at 0° C., was added methyl magnesium chloride (166 ml, 498 mmol, 3 M in THF) over a period of 45 min. The reaction mixture was stirred at 25° C. for 4 h and then the reaction mixture was quenched with aqueous saturated ammonium chloride (40 mL) and the whole mixture was extracted with ethyl acetate (3×50 mL). The combined organic layer was washed with saturated brine (100 mL), dried over anhydrous sodium sulfate and concentrated under reduced pressure. The resulting residue was then distilled under reduced pressure (61-63° C./4-5 mbar) to yield 3-methyleneoctan-2-ol (39 g, 77%) as a colourless liquid.

¹H NMR (400 MHz, CDCl₃): δ 4.94 (s, 1H), 4.70 (s, 1H), 4.14 (q, J=6.4 Hz, 1H), 2.82 (br s, 1H), 2.04-1.87 (m, 2H), 1.42-1.35 (m, 2H), 1.27-1.18 (overlapped signals, 7H), 0.82 (t, J=6.8 Hz, 3H). ¹³C NMR (100 MHz, CDCl₃): δ 153.4, 107.7, 70.6, 31.7, 31.4, 27.6, 22.7, 22.3, 13.6.

Step 2: Synthesis of 3-((3-methyleneoctan-2-yl)oxy)propanenitrile

To a mixture of 3-methyleneoctan-2-ol (14 g, 98.42 mmol), KOH (6.63 g, 118.16 mmol), tetra-n-butyl ammonium bromide (1.51 g, 4.68 mmol) in water (40 mL) at 25° C. was added acrylonitrile (7.87 g, 9.72 mL, 148.32 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation (82-85° C./3 mbar) to afford 3-((3-methyleneoctan-2-yl)oxy)propanenitrile (12.6 g, 65%)) as a colourless liquid.

Odor Note: Dry earthy, dusty.

¹H NMR (400 MHz, CDCl₃): δ 4.91 (s, 1H), 4.80 (d, J=1.6 Hz, 1H), 3.78 (q, J=6.4 Hz, 1H), 3.52-3.46 (m, 1H), 3.38-3.33 (m, 1H), 2.47 (t, J=6.4 Hz, 2H), 1.93-1.88 (m, 2H), 1.42-1.34 (m, 2H), 1.29-1.19 (m, 4H), 1.16 (d, J=6.4 Hz, 3H), 0.81 (t, J=6.8 Hz, 3H). ¹³C NMR (100 MHz, CDCl₃): δ 149.8, 118.1, 110.6, 79.6, 62.6, 31.7, 30.3, 27.4, 22.4, 20.3, 18.9, 13.6.

Example 20

Synthesis of 3-((3-methyleneoctan-2-yl)oxy)butanenitrile

To a mixture of 3-methyleneoctan-2-ol (12 g, 84.36 mmol), KOH (7.10 g, 126.54 mmol), tetra-n-butyl ammonium bromide (1.360 g, 4.22 mmol) in water (40 mL) at 25° C. was added (E)-but-2-enenitrile (7.36 g, 8.93 ml, 109.7 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation (82-88° C./3 mbar) to afford 3-((3-methyleneoctan-2-yl)oxy)butanenitrile (14.8 g, 66%) as an inseparable 6:4 mixture of two diastereomers.

Odor Note: Dry, fishy, aqua, ozonic.

$^1$H NMR (400 MHz, CDCl$_3$): δ 4.94-4.93 (m, 1H), 4.81-4.79 (m, 1H), 3.93-3.87 (m, 1H), 3.69-3.60 (m, 1H), 2.43-2.37 (m, 2H), 2.01-1.86 (m, 2H), 1.45-1.35 (m, 2H), 1.27-1.23 (m, 3H), 1.20-1.12 (overlapped signals, 7H), 0.83 (t, J=6.8 Hz, 3H).

Example 21

Synthesis of 3-((4-methylenenonan-3-yl)oxy)propanenitrile

Step 1: Synthesis of 4-methylenenonan-3-ol

To a solution of 2-methyleneheptanal (55 g, 435.8 mmol) in tetrahydrofuran (45 ml) at 0° C. was added ethyl magnesium chloride (283 ml, 566 mmol, 2M in THF) over a period of 25 min. The reaction mixture was stirred at 25° C. for 4 h and then the reaction mixture was quenched with aqueous saturated ammonium chloride (40 mL). The resulting precipitate was filtered off and washed with EtOAc (150 mL). The combined organic layer was washed with saturated brine (100 mL), dried over anhydrous sodium sulfate and concentrated under reduced pressure. The resulting crude product was purified by distillation (65-70° C./4 mbar) to afford 4-methylenenonan-3-ol (28 g, 41%) as a colorless liquid.

Step 2: Synthesis of 3-((4-methylenenonan-3-yl)oxy)propanenitrile

To a mixture of 4-methylenenonan-3-ol (10 g, 64 mmol), potassium hydroxide (5.39 g, 96.06 mmol), tetra-n-butyl ammonium bromide (1.031 g, 3.2 mmol) in water (30 mL) at 25° C. was added a solution of acrylonitrile (4.41 g, 5.45 ml, 83.11 mmol) in dichloromethane (8 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation (98-102° C./3 mbar) to afford 3-((4-methylenenonan-3-yl)oxy)propanenitrile (7.88 g, 59% yield) as a colorless liquid.

Odor Note: Dry, earthy, dusty.

$^1$H NMR (400 MHz, CDCl$_3$): δ 4.91 (s, 1H). 4.87-4.86 (m, 1H), 3.58-3.50 (m, 2H), 3.36-3.32 (m, 1H), 2.49 (t, J=6.4 Hz, 2H), 2.0-1.8 (m, 2H), 1.58-1.44 (m, 2H), 1.43-1.33 (m, 2H), 1.31-1.18 (m, 4H), 0.87-0.80 (two overlapped t, 6H). $^{13}$C NMR (100 MHz, CDCl$_3$): δ 148.2, 118.0, 112.3, 86.3, 62.8, 31.8, 29.9, 27.7, 27.4, 22.5, 19.0, 13.5, 10.0.

Example 22

Synthesis of 3-((4-methylenenonan-3-yl)oxy)butanenitrile

To a mixture of 4-methylenenonan-3-ol (10 g, 64 mmol), potassium hydroxide (5.39 g, 96.06 mmol), tetra-n-butyl ammonium bromide (1.031 g, 3.2 mmol) in water (30 mL) at 25° C. was added (E)-but-2-enenitrile (5.58 g, 6.77 ml, 83.17 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by fractional distillation (88° C./3 mbar) to afford 3-((4-methylenenonan-3-yl)oxy)butanenitrile (0.89 g, 6% yield) as an inseparable 64:36 mixture of diastereomers. Unreacted 4-methylenenonan-3-ol (9 g) was recovered.

Odor Note: ND $^1$H NMR (400 MHz, CDCl$_3$): δ 4.91 (s, 1H), 4.86-4.85 (s, 1H), 3.66-3.57 (m, 2H), 2.43-2.38 (m, 2H), 1.95-1.85 (m, 2H), 1.58-1.33 (m, 4H), 1.30-1.17 (overlapped signals, 7H), 0.85-0.80 (two overlapped t, 6H).

Example 23

Synthesis of 3-((2-methyleneoctyl)oxy)butanenitrile

Prepared from 2-methyleneoctan-1-ol and (E)-but-2-enenitrile by a procedure as in example 30.

Odor Note: ND $^1$H NMR (400 MHz, CDCl$_3$): δ 5.00 (s, 1H), 4.89 (s, 1H), 3.96, 3.91 (ABq, J$_{AB}$=12.4 Hz, 2H), 3.74 (sext, J=6.0 Hz, 1H), 2.51 (d, J=5.6 Hz, 2H), 2.04 (t, J=7.6 Hz, 2H), 1.44-1.39 (m, 2H), 1.33-1.27 (overlapped signals, 9H), 0.87 (t, J=6.8 Hz, 3H). $^{13}$C NMR (100 MHz, CDCl$_3$): δ 145.9, 117.4, 111.7, 71.8, 70.2, 33.0, 31.9, 29.1, 27.5, 24.9, 22.6, 19.6, 14.1.

Example 25

Synthesis of 3-((4-methylenedecan-3-yl)oxy)propanenitrile

Step 1: Synthesis of 4-methylenedecan-3-ol

To a solution of 2-methyleneoctanal (60 g, 427.86 mmol) in tetrahydrofuran (200 ml) at 0° C. was added ethyl magnesium chloride (214 mL, 428 mmol, 2M in THF) over a period of 25 min. The reaction mixture was stirred at 25° C. for 4 h and then the reaction mixture was quenched with aqueous saturated ammonium chloride (40 mL). The resulting precipitate was filtered off and washed with EtOAc (150 mL). The combined organic layer was washed with saturated brine (100 mL), dried over anhydrous sodium sulfate and concentrated under reduced pressure. The resulting crude product was purified by distillation (70° C./4 mbar) to afford 4-methylenedecan-3-ol (38.7 g, 53%) as a colorless liquid.

$^1$H NMR (300 MHz, CDCl$_3$): δ 4.98 (s, 1H), 4.83 (s, 1H), 3.98 (t, J=6.3 Hz, 1H), 2.08-1.91 (m, 2H), 1.78 (br s, 1H), 1.63-1.51 (m, 2H), 1.49-1.39 (m, 2H), 1.35-1.27 (overlapped signals, 6H), 0.83-0.91 (overlapped t, 6H). $^{13}$C NMR (75 MHz, CDCl$_3$): δ 152.0, 109.4, 33.1, 31.9, 31.4, 29.4, 28.3, 27.8, 22.7, 14.2, 9.9.

Step 2: Synthesis of 3-((4-methylenedecan-3-yl)oxy)propanenitrile

To a mixture of 4-methylenedecan-3-ol (14 g, 82.21 mmol), potassium hydroxide (6.00 g, 106.93 mmol), tetra-n-butyl ammonium bromide (1.325 g, 4.11 mmol) in water (40 mL) at 25° C. was added a solution of acrylonitrile (6.54 g, 123.25 mmol) in dichloromethane (10 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation (113° C./3 mbar) to afford 3-((4-methylenedecan-3-yl)oxy)propanenitrile (11.7 g, 63%) as a colorless liquid.

Odor Note: ND $^1$H NMR (300 MHz, CDCl$_3$): δ 4.97 (s, 1H), 4.94 (s, 1H), 3.75-3.56 (m, 2H), 3.46-3.39 (m, 1H), 2.56 (t, J=6.3 Hz, 2H), 1.98-1.91 (m, 2H), 1.67-1.51 (m, 2H), 1.48-1.41 (m, 2H), 1.37-1.29 (m, 6H), 0.89 (overlapped t, 6H). $^{13}$C NMR (75 MHz, CDCl$_3$): δ 148.2, 118.1, 112.0, 86.4, 62.9, 31.8, 30.0, 29.3, 27.7, 26.9, 22.6, 18.9, 14.1, 10.2.

Example 26

Synthesis of 3-((4-methylenedecan-3-yl)oxy)butanenitrile

To a mixture of 4-methylenedecan-3-ol (14 g, 82.21 mmol), potassium hydroxide (6.92 g, 123.33 mmol), tetra-n-butyl ammonium bromide (1.325 g, 4.11 mmol) in water (30 mL) at 25° C. was added a solution of (E)-but-2-enenitrile (6.62 g, 98.67 mmol) in dichloromethane (10 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation (113° C./3 mbar) to afford 3-((4-methylenedecan-3-yl)oxy)butanenitrile (9.8 g, 50%) as an inseparable mixture of diastereomers.

Odor Note: ND $^1$H NMR (300 MHz, CDCl$_3$): δ 4.97 (s, 1H), 4.92 (s, 1H), 3.74-3.62 (m, 2H), 2.47-2.43 (m, 2H), 2.01-1.91 (m, 2H), 1.62-1.41 (m, 4H), 1.36-1.25 (overlapped m, 9H), 0.84-0.92 (overlapped t, 6H).

Example 27

Synthesis of 3-((2-methylenenonyl)oxy)propanenitrile

Step 1: Synthesis of 2-methylenenonanal

Nonanal (25.0 g, 175.76 mmol) was added to a stirred mixture of aqueous 37% formaldehyde (5.81 g, 15.70 ml, 193.43 mmol), di-n-butylamine (1.136 g, 8.79 mmol) and acetic acid (1.055 g, 17.57 mmol) at 50° C. over a period of 1 h. After completion of addition, the reaction mixture was stirred for 2 h at 50° C. and then at room temperature for 15 h. The organic phase was separated, washed with water and dried over anhydrous sodium sulfate. The crude product was distilled in vacuo under reduced pressure (48-50° C./4 mbar) to afford 2-methylenenonanal (13.0 g, 48%) as a colorless liquid.

$^1$H NMR (400 MHz, CDCl$_3$): δ 9.47 (s, 1H), 6.18 (s, 1H), 5.92 (s, 1H), 2.16 (t, J=7.6 Hz, 2H), 1.39-1.35 (m, 2H), 1.24-1.19 (m, 8H), 0.80 (t, J=6.8 Hz, 3H). $^{13}$C NMR (100 MHz, CDCl$_3$): δ 193.8, 149.5, 132.8, 30.7, 28.3, 28.0, 26.7, 21.6, 13.1.

Step 2: Synthesis of 2-methylenenonan-1-ol

Sodium borohydride (1.28 g, 33.83 mmol) was added to a stirred mixture of 2-methylenenonanal (13.0 g, 84.28 mmol) and water (300 ml) at 10-15° C. over a period of 15 min. The reaction mixture was then stirred for 3 h at 25° C. Subsequently, the reaction mixture was quenched with aqueous 10% hydrochloric acid (100 ml) and then extracted with MTBE (2×50 mL). The organic phase was separated and successively washed with water (50 mL), aqueous 10% sodium carbonate (50 ml) and brine (50 ml). The organic layer was dried over anhydrous sodium sulfate and concentrated under reduced pressure to afford 2-methylenenonan-1-ol (13.0 g, 98%) which was used as such in the next step.

$^1$H NMR (400 MHz, CDCl$_3$): δ 4.93 (s, 1H), 4.79 (s, 1H), 4.01 (s, 2H), 1.98 (t, J=8.0 Hz, 2H), 1.60 (s, 1H), 1.41-1.34 (m, 2H), 1.30-1.16 (m, 8H), 0.81 (t, J=6.4 Hz, 3H). $^{13}$C NMR (100 MHz, CDCl$_3$): δ 149.2, 108.8, 65.6, 33.1, 31.8, 29.7, 29.1, 27.7, 22.4, 14.0.

Step 3: Synthesis of 3-((2-methylenenonyl)oxy)propanenitrile

To a mixture of 2-methylenenonan-1-ol (13.0 g, 83.18 mmol), potassium hydroxide (5.13 g, 91.42 mmol), tetra-n-butyl ammonium bromide (1.341 g, 4.16 mmol) in water (20 mL) at 25° C. was added a solution of acrylonitrile (6.66 g, 8.22 ml, 125.48 mmol) in dichloromethane (10 mL) over a period of 20 min. The reaction mixture was stirred at 25° C. for 15 h. The reaction mixture was acidified by dil. HCl till pH 3-4. The organic layer was separated and the aqueous layer was extracted with diethyl ether (50 ml). The combined organic layer was successively washed with water (20 ml) and brine (20 ml) and the volatiles were removed under reduced pressure. The residue was purified by distillation (98-100° C./3 mbar) to afford 3-((2-methylenenonyl)oxy) propanenitrile (13.8 g, 79%) as a colorless liquid.

Odor Note: ND $^1$H NMR (400 MHz, CDCl$_3$): δ 5.03 (s, 1H), 4.95 (s, 1H), 3.98 (s, 2H), 3.64 (t, J=6.4 Hz, 2H), 2.63 (t, J=6.4 Hz, 2H), 2.06 (t, J=7.6 Hz, 2H), 1.50-1.44 (m, 2H), 1.33-1.29 (overlapped signals, 8H), 0.90 (t, J=7.2 Hz, 3H). $^{13}$C NMR (100 MHz, CDCl$_3$): δ 145.5, 117.9, 111.9, 74.3, 64.4, 33.3, 31.6, 29.3, 29.1, 27.5, 22.6, 18.8, 14.0.

Example 28

Synthesis of 3-((3-methylenedecan-2-yl)oxy)propanenitrile

Step 1: Synthesis of 3-methylenedecan-2-ol

A solution of 2-methylenenonanal (50 g, 324.15 mmol) in tetrahydrofuran (200 ml) was cooled to 0° C. and then a solution of methyl magnesium chloride (162 ml, 3 M in THF, 486 mmol) was added dropwise. The reaction mixture was stirred at RT for 4 h. The reaction mixture was quenched with ammonium chloride solution (200 ml). The solution was extracted with ethyl acetate (3×150 ml). The combined organic layer was dried over anhydrous sodium sulphate and concentrated under reduced pressure. The resulting residue was distilled under reduced pressure (75-77° C./3 mbar) to give pure 3-methylenedecan-2-ol (30.0 g, 54%) as colourless liquid.

$^1$H NMR (400 MHz, CDCl$_3$): δ 5.05 (s, 1H), 4.82 (s, 1H), 4.26 (q, J=6.4 Hz, 2H), 1.98-2.14 (m, 2H), 1.68 (bs, 1H), 1.44-1.51 (m, 2H), 1.29-1.36 (m, 10H), 0.90 (t, J=6.8 Hz, 3H). $^{13}$C NMR (100 MHz, CDCl$_3$): δ 153.5, 107.8, 70.8, 31.8, 31.7, 29.5, 29.3, 28.0, 22.6, 22.1, 13.8.

Step 2: Synthesis of 3-((3-methylenedecan-2-yl)oxy)propanenitrile

To a solution of 3-methylenedecan-2-ol (13.0 g, 76.33 mmol), KOH (4.71 g, 83.94 mmol) and tetra-n-butylammonium bromide (1.23 g, 3.81 mmol) in water (30 ml) was slowly added a solution of acrylonitrile (6.08 g, 114.59 mmol) in dichloromethane (10 mL) at 25° C. The reaction mixture was maintained at 30° C. for 15 h. The reaction mixture was acidified by dil. HCl till pH 3-4. The organic layer was separated and the aqueous layer was extracted with diethyl ether (2×40 mL). The organic layer was separated, washed with water (50 ml) and brine (50 ml). The organic layer was concentrated under pressure and the resulting residue was purified by distillation under reduced pressure (100° C./2-3 mbar) to afford 3-((3-methylenedecan-2-yl)oxy)propanenitrile (6.0 g, 35%) of pure product.

Odor Note: Dry, fishy, ozonic.

$^1$H NMR (400 MHz, CDCl$_3$): δ 4.93 (s, 1H), 4.83 (d, J=2.4 Hz, 1H), 3.80 (q, J=6.4 Hz, 1H), 3.57-3.50 (m, 1H), 3.42-3.36 (m, 1H), 2.50 (t, J=6.4 Hz, 2H), 1.92 (t, J=7.2 Hz, 2H), 1.40-1.35 (m, 2H), 1.24-1.19 (m, 11H), 0.82 (t, J=6.8 Hz, 3H). $^{13}$C NMR (100 MHz, CDCl$_3$): δ 149.9, 118.2, 111.1, 80.3, 62.9, 32.0, 30.4, 29.7, 29.4, 28.0, 22.8, 20.6, 19.2, 14.3.

Example 29

Synthesis of 3-((3-methylenedecan-2-yl)oxy)butanenitrile

To a mixture of 3-methylenedecan-2-ol (10.0 g, 58.72 mmol), KOH (4.94 g, 88.04 mmol) and tetra-n-butylammonium bromide (0.947 g, 2.94 mmol) in water (15 ml) at 25° C. was added a solution of (E)-but-2-enenitrile (5.12 g, 76.13 mmol) in dichloromethane (8 mL) over a period of 20 min. The reaction mixture was stirred at 25° C. for 48 h. The reaction mixture was acidified by dil. HCl till pH 3-4. The organic layer was separated and the aqueous layer was extracted with diethyl ether (2×50 ml). The combined organic layer was successively washed with water (50 ml), brine (50 ml) and the volatiles were removed under reduced pressure. The residue was distilled under reduced pressure (95-100° C./3 mbar) to afford 3-((3-methylenedecan-2-yl)oxy)butanenitrile (5.0 g, 36%) as an inseparable mixture of diastereomers.

Odor Note: ND.

$^1$H NMR (400 MHz, CDCl$_3$): δ 4.93 (s, 1H), 4.83-4.80 (m, 1H), 3.87-3.93 (m, 1H), 3.72-3.61 (m, 2H), 2.45-2.37 (m, 2H), 1.96-1.90 (m, 2H), 1.44-1.34 (m, 2H), 1.25-1.16 (m, 13H), 0.82 (t, J=7.2 Hz, 3H).

Example 32

Synthesis of 3-((2-methyl-5-methylenenonan-4-yl)oxy)propanenitrile

Step-1: Synthesis of 2-methyl-5-methylenenonan-4-ol

To the solution of 2-methylenehexanal (20 g, 178 mmol) in tetrahydrofuran (350 ml) cooled at 0° C., then solution of isobutyl magnesium bromide (107 ml, 214 mmol, 2 M solution in THF) was added over a period of 15 min. The reaction mixture was stirred at RT for 3 h. Then the reaction mixture was quenched with saturated ammonium chloride solution (50 mL) and the mixture was extracted with ethyl acetate (3×100 ml). The organic layer was dried over sodium sulphate and concentrated under reduced pressure. The crude product was purified by column chromatography using 100-200 silica gel using 3% ethyl acetate in hexane as an eluent to afford 2-methyl-5-methylenenonan-4-ol (13.0 g, 76 mmol, 42.8%) as colourless liquid.

$^1$H NMR (300 MHz, CDCl$_3$): δ 5.72-5.86 (m, 1H), 5.09-5.16 (m, 2H), 5.03 (s, 1H), 4.85 (d, J=1.2 Hz, 1H), 4.08-4.12 (m, 1H), 2.34-2.38 (m, 1H), 2.21-2.31 (m, 1H), 1.92-2.13 (m, 2H), 1.80 (s, 1H), 1.24-1.50 (m, 4H), 0.90 (t, J=7.2 Hz, 3H).

Step-2: Synthesis of 3-((2-methyl-5-methylenenonan-4-yl)oxy)propanenitrile

To a mixture of 2-methyl-5-methylenenonan-4-ol (6 g, 35.2 mmol), KOH (2.174 g, 38.8 mmol), water (12 mL) and tetrabutylammonium bromide (0.57 g, 1.76 mmol) at 25° C. was added acrylonitrile (2.80 g, 52.8 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (40 mL). The combined organic layer was successively washed with water and brine. The volatiles were removed under reduced pressure and the resulting residue was distilled under reduced pressure (94-97° C. at 0.1 mbar) to afford 3-((2-methyl-5-methylenenonan-4-yl)oxy)propanenitrile (2.2 g, 9.85 mmol, 28.0%)

Odor Note: ND.

$^1$H NMR (300 MHz, CDCl$_3$): δ 4.97 (s, 1H), 4.90-4.92 (m, 1H), 3.73 (dd, J=8.4 Hz & 5.1 Hz, 1H), 3.57-3.64 (m, 1H), 3.35-3.43 (m, 1H), 2.54 (t, J=6.3 Hz, 2H), 1.91-1.96 (m, 2H), 1.69-1.73 (m, 1H), 1.24-1.57 (m, 6H), 0.87-0.94 (m, 9H). $^{13}$C NMR (100 MHz, CDCl$_3$): δ 148.8, 118.1, 111.7, 83.3, 62.9, 43.5, 30.0, 29.7, 24.7, 23.1, 22.8, 22.4, 19.0, 14.1.

Example 33

Synthesis of 3-((2-methyl-5-methylenenonan-4-yl)oxy)butanenitrile

To a mixture of 2-methyl-5-methylenenonan-4-ol (8 g, 47.0 mmol), KOH (2.90 g, 51.7 mmol), water (12 mL) and tetrabutylammonium bromide (0.757 g, 2.34 mmol) at 25° C. was added (E)-but-2-enenitrile (4.73 g, 70.5 mmol) over a period of 20 min. The reaction mixture was stirred at 25° C. for 48 h. The reaction mixture was acidified by dil. HCl till pH 3-4. The organic layer was separated and the aqueous layer was extracted with diethyl ether (40 mL). The combined organic layer was successively washed with water and brine. The volatiles were removed under reduced pressure and the resulting residue was distilled by Kugelrohr under reduced pressure (157° C. at 0.1 mbar) to afford 3-((2-methyl-5-methylenenonan-4-yl)oxy)butanenitrile (2.0 g, 8.43 mmol, 17.93%) as a colorless liquid. GC purity 99.0%.

Odor Note: ND.

$^1$H NMR (300 MHz, CDCl$_3$): δ 4.98 (s, 1H), 4.89-4.91 (m, 1H), 3.83 (dd, J=8.4 Hz & 5.4 Hz, 1H), 3.66-3.75 (m, 1H), 2.42-2.48 (m, 2H), 1.93-1.97 (m, 2H), 1.21-1.70 (m, 10H), 0.84-0.91 (m, 9H). $^{13}$C NMR (100 MHz, CDCl$_3$): δ 149.6, 117.8, 111.7, 81.3, 68.3, 43.7, 30.0, 29.6, 25.9, 24.5, 24.1, 22.8, 22.3, 18.9, 14.1.

Example 34

Synthesis of 3-((6-methylenedecan-5-yl)oxy)propanenitrile

Step-1: Synthesis of 6-methylenedecan-5-ol

To the solution of 2-methylenehexanal (50.0 g, 446 mmol) in tetrahydrofuran cooled to 0° C., was added, butyl magnesium chloride (267 ml, 535 mmol, 2 M solution in THF) over a period of 15 min. The reaction mixture was stirred at RT for 3 h. Then the reaction mixture was quenched with saturated ammonium chloride solution (50 mL) and the mixture was extracted with ethyl acetate (3×100 ml). The organic layer was dried over sodium sulphate and concentrated under reduced pressure. which was purified by column chromatography using 100-200 silica gel using 3% ethyl acetate in hexane as an eluent to afford 6-methylenedecan-5-ol (24 g, 141 mmol, 31.6%) as colourless liquid.

$^1$H NMR (300 MHz, CDCl$_3$): δ 4.98 (s, 1H), 4.80-4.82 (m, 1H), 4.04 (t, J=6.0 Hz, 1H), 1.90-2.11 (m, 2H), 1.68 (bs, 1H), 1.22-1.54 (m, 10H), 0.84-1.19 (m, 6H).

Step-2: Synthesis of 3-((6-methylenedecan-5-yl)oxy)propanenitrile

To a mixture of 6-methylenedecan-5-ol (8.0 g, 47.0 mmol), KOH (2.90 g, 51.7 mmol), water (16 mL) and tetrabutylammonium bromide (0.757 g, 2.34 mmol) at 25° C. was added acrylonitrile (3.74 g, 70.5 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (50 mL). The combined organic layer was successively washed with water and brine. The volatiles were removed under reduced pressure and the resulting residue was distilled under reduced pressure (90-93° C. at 2 mbar) to afford 3-((6-methylenedecan-5-yl)oxy)propanenitrile (2.0 g, 8.95 mmol, 19.06%) as a colorless liquid. GC purity 98.0%.

Odor Note: ND.

$^1$H NMR (300 MHz, CDCl$_3$): δ 4.97 (s, 1H), 4.91 (s, 1H), 3.67-3.73 (m, 2H), 2.44-2.48 (m, 2H), 1.85-2.10 (m, 2H), 1.10-1.62 (m, 13H), 0.83-0.95 (m, 6H).

Example 35

Synthesis of 3-((6-methylenedecan-5-yl)oxy)butanenitrile

To a mixture of 6-methylenedecan-5-ol (8 g, 47.0 mmol), KOH (2.90 g, 51.7 mmol), water (16 mL) and tetrabutylammonium bromide (0.757 g, 2.349 mmol) at 25° C. was added (E)-but-2-enenitrile (4.73 g, 70.5 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (50 mL). The combined organic layer was successively washed with water and brine. The volatiles were removed under reduced pressure and the resulting residue was distilled under reduced pressure (90-93° C. at 2 mbar) to afford 3-((6-methylenedecan-5-yl)oxy)butanenitrile (2.0 g, 8.43 mmol, 17.93%) as a colourless liquid. GC purity 98.0%.

Odor Note: mild dry note.

$^1$H NMR (300 MHz, CDCl$_3$): δ 4.97 (s, 1H), 4.91 (s, 1H), 3.67-3.73 (m, 2H), 2.44-2.48 (m, 2H), 1.85-2.10 (m, 2H), 1.10-1.62 (m, 13H), 0.83-0.95 (m, 6H).

Example 36

Synthesis of 2-(((2-methylenehexyl)oxy)methyl)hexanenitrile

Synthesis of Substituted 2-Methylene oximes (VI)

The oximes were prepared by heating substituted 2-Methylene aldehyde (III) (1 eq) with hydroxylamine hydrochloride (1.5 eq) in methanol and sodium acetate (1.5 eq) as base at 60-80° C. for 4-10 hrs. After completion of reaction mixture cooled to room temperature and methanol removed at reduced pressure on rotaevaporator. The residue was diluted with diethyl ether and washed with water. Organic layer dried over sodium sulfate and solvent was evaporated under reduced pressure to afford substituted 2-Methylene oxime (VI). The crude was purified by column chromatography to afford substituted 2-Methylene oxime (VI) 60-80% yield.

Synthesis of Substituted 2-Methylene Nitriles (V)

The substituted 2-methylene oxime (VI) was heated with acetic anhydride (2 eq) at 110-140° C. for 6-8 hrs. After completion of reaction, mixture was cooled to room temperature and extracted with diethyl ether. Organic layer was washed with aqueous sodium bicarbonate (2 times) dried over sodium sulfate and solvents evaporated under reduced pressure to afford crude nitrile. Crude nitrile was purified by silica gel column chromatography to afford pure substituted 2-Methylene nitrile (V). Yield 25-30%.

To a mixture of 2-methylenehexan-1-ol (6 g, 52.5 mmol), KOH (3.24 g, 57.8 mmol), water (10 mL) and tetrabutylammonium bromide (0.847 g, 2.63 mmol) at 25° C. was added 2-methylenehexanenitrile (8.60 g, 79 mmol) over a period of 20 min. The reaction mixture was stirred at 25° C. for 48 h. The reaction mixture was acidified by dil. HCl till pH 3-4. The organic layer was separated and the aqueous layer was extracted with diethyl ether (40 mL). The combined organic layer was successively washed with water and brine. The volatiles were removed under reduced pressure and the resulting residue was distilled under reduced pressure (101° C. at 0.1 mbar) to afford 2-(((2-methylenehexyl)oxy)methyl)hexanenitrile (3.8 g, 17.02 mmol, 32.4%) as a colorless liquid. GC purity 98.0%.

Odor Note: ND.

$^1$H NMR (300 MHz, CDCl$_3$): δ 4.99 (s, 1H), 4.91 (s, 1H), 3.95 (s, 2H), 3.45-3.55 (m, 2H), 2.72-2.81 (m, 2H), 2.04 (t, J=7.8 Hz, 2H), 1.24-1.68 (m, 10H), 0.84-0.94 (m, 6H). $^{13}$C NMR (100 MHz, CDCl$_3$): δ 145.6, 120.8, 112.0, 74.4, 69.4, 32.7, 32.6, 29.8, 29.2, 28.7, 22.5, 22.3, 14.0, 13.8.

Example 37

Synthesis of 2-(((2-methylenehexyl)oxy)methyl)pentanenitrile

To a mixture of 2-methylenehexan-1-ol (10 g, 88 mmol), KOH (5.40 g, 96 mmol), water (10 mL) and tetrabutylammonium bromide (1.412 g, 4.38 mmol) at 25° C. was added 2-methylenepentanenitrile (12.50 g, 131 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (50 mL). The combined organic layer was successively washed with water and brine. The volatiles were removed under reduced pressure and the resulting residue was distilled under reduced pressure (98-101° C. at 2 mbar) to afford 2-(((2-methylenehexyl)oxy)methyl)pentanenitrile (3.0 g, 14.33 mmol, 16.36%) as a colourless liquid. GC purity 98.0%.

Odor Note: ND.

$^1$H NMR (300 MHz, CDCl$_3$): δ 5.00 (s, 1H), 4.92 (s, 1H), 3.96 (s, 2H), 3.46-3.56 (m, 2H), 2.75-2.82 (m, 1H), 2.05 (t, J=7.8 Hz, 2H), 1.25-1.68 (m, 8H), 0.82-0.97 (m, 6H). $^{13}$C NMR (100 MHz, CDCl$_3$): δ 145.6, 120.8, 112.0, 74.4, 69.4, 32.8, 32.4, 31.0, 29.8, 22.5, 20.3, 14.0, 13.6.

Example 38

Synthesis of 3-methyl-2-(((2-methylenehexyl)oxy) methyl)butanenitrile

To a mixture of 2-methylenehexan-1-ol (6 g, 52.5 mmol), KOH (3.24 g, 57.8 mmol), water (10 mL) and tetrabutylammonium bromide (0.847 g, 2.63 mmol) at 25° C. was added 3-methyl-2-methylenebutanenitrile (7.50 g, 79 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (40 mL). The combined organic layer was successively washed with water and brine. The volatiles were removed under reduced pressure and the resulting residue was distilled by kugelrohr under reduced pressure (130° C. at 2 mbar) to afford afford 3-methyl-2-(((2-methylenehexyl)oxy)methyl)butanenitrile (1.5 g, 13.6%) as a colorless liquid. GC purity 99.0%.

Odor Note: ND $^1$H NMR (300 MHz, CDCl$_3$): δ 5.00 (s, 1H), 4.92 (s, 1H), 3.95 (s, 2H), 3.49-3.60 (m, 2H), 2.67-2.74 (m, 1H), 2.00-2.07 (m, 3H), 1.25-1.46 (m, 4H), 1.08 (d, J=6.9 Hz, 6H), 0.93 (t, J=6.7 Hz, 3H).

Example 39

Synthesis of 2-((3-methyl-2-methylenebutoxy)methyl)pentanenitrile

To a mixture of 3-methyl-2-methylenebutan-1-ol (10.0 g, 100 mmol), KOH (6.16 g, 110 mmol), water (10 mL) and tetrabutylammonium bromide (1.60 g, 4.99 mmol) at 25° C. was added 2-methylenepentanenitrile (14.25 g, 150 mmol) over a period of 20 min. The reaction mixture was stirred at 25° C. for 15 h. The reaction mixture was acidified by dil. HCl till pH 3-4. The organic layer was separated and the aqueous layer was extracted with diethyl ether (60 mL). The combined organic layer was successively washed with water and brine. The volatiles were removed under reduced pressure and the resulting residue was distilled under reduced pressure (103° C. at 2 mbar) to afford 2-((3-methyl-2-methylenebutoxy)methyl)pentanenitrile (3.0 g, 15.36 mmol, 15.39%) as a colorless liquid. GC purity 98.0%.

Odor Note: ND.

$^1$H NMR (300 MHz, CDCl$_3$): δ 4.99 (s, 1H), 4.94 (s, 1H), 4.01 (s, 2H), 3.47-3.57 (m, 2H), 2.75-2.82 (m, 1H), 2.29-2.38 (m, 1H), 1.44-1.68 (m, 5H), 1.06 (d, J=6.9 Hz, 6H), 0.94 (t, J=5.4 Hz, 3H).

Example 40

Synthesis of 3-((5-methylenenon-1-en-4-yl)oxy)propanenitrile

Step-1: Synthesis of 5-methylenenon-1-en-4-ol

To a solution of 2-methylenehexanal (50.0 g, 446 mmol) taken in tetrahydrofuran (350 ml) cooled to 0° C., was added allyl magnesium chloride (267 ml, 535 mmol, 2 M solution in THF) over a period of 15 min. The reaction mixture was stirred at RT for 3 h. Then the reaction mixture was quenched with saturated ammonium chloride solution (50 mL) and the mixture was extracted with ethyl acetate (3×100 ml). The organic layer was dried over sodium sulphate and concentrated under reduced pressure. The crude product was purified by column chromatography using 100-200 silica gel and 3% ethyl acetate in hexane as an eluent to afford 5-methylenenon-1-en-4-ol (26.0 g, 169 mmol, 37.8%) as colourless liquid.

$^1$H NMR (300 MHz, CDCl$_3$): δ 5.72-5.86 (m, 1H), 5.09-5.16 (m, 2H), 5.03 (s, 1H), 4.85 (d, J=1.2 Hz, 1H), 4.08-4.12 (m, 1H), 2.34-2.38 (m, 1H), 2.21-2.31 (m, 1H), 1.92-2.13 (m, 2H), 1.80 (s, 1H), 1.24-1.50 (m, 4H), 0.90 (t, J=7.2 Hz, 3H).

Step-2: Synthesis of 3-((5-methylenenon-1-en-4-yl)oxy)propanenitrile

A solution of 5-methylenenon-1-en-4-ol (10.0 g, 64.8 mmol), potassium hydroxide (4.00 g, 71.3 mmol) and tetrabutylammonium bromide (1.04 g, 3.24 mmol) in water (15 ml) was stirred for 30 min at room temperature. Then acrylonitrile (4.13 g, 78 mmol) was slowly added to the above mixture and the reaction was continued at RT for 16 hrs.

The reaction mixture was acidified with di. HCl till pH 3-4. The organic layer was separated and washed with water (20 ml), dried over anhydrous sodium sulphate and concentrated.

The residue was purified by column chromatography 100-200 mesh size silica gel using 3-4% ethyl acetate in hexane as an eluent which afford mixture, this mixture was distilled under reduced pressure (150° C. and 3 mbar) to give 3-((5-methylenenon-1-en-4-yl)oxy)propanenitrile (2.6 g, 12.54 mmol, 19.35%) as a colourless liquid.

Odor Note: Dry, nitrile-like, mild odor.

$^1$H NMR (300 MHz, CDCl$_3$): δ 5.74-5.80 (m, 1H), 4.96-5.10 (m, 4H), 3.59-3.75 (m, 2H), 3.40-3.47 (m, 1H), 2.56 (t, J=6.3 Hz, 2H), 2.24-2.38 (m, 2H), 1.94-2.01 (m, 2H), 1.32-1.45 (m, 4H), 0.92 (t, J=7.2 Hz, 3H).

Example 41

Synthesis of 3-((5-methylenenon-1-en-4-yl)oxy)butanenitrile

A solution of 5-methylenenon-1-en-4-ol (10.0 g, 64.8 mmol), potassium hydroxide (4.00 g, 71.3 mmol) and tetrabutylammonium bromide (1.04 g, 3.24 mmol) in water (15 ml) was stirred for 30 min at room temperature. Then crotononitrile (cis+trans) (6.36 ml, 78 mmol) was slowly added to the above mixture and the reaction was continue at RT for 16 hrs. The reaction mixture was acidified with di. HCl till pH 3-4. The organic layer was separated and washed with water (20 ml), dried over anhydrous sodium sulphate and concentrated. The residue was purified by column chromatography 100-200 mesh size silica gel using 3-4% ethyl acetate in hexane as an eluent to obtain mix, which was further purified by distillation under reduced pressure (150° C. and 3 mbar) to give 3-((5-methylenenon-1-en-4-yl)oxy) butanenitrile (4.2 g, 18.97 mmol, 29.3%) as a colourless liquid.

Odor Note: ND.

$^1$H NMR (300 MHz, CDCl$_3$): δ 5.75-5.80 (m, 1H), 4.93-5.10 (m, 4H), 3.68-3.81 (m, 2H), 2.45 (d, J=5.7 Hz, 2H), 2.24-2.38 (m, 2H), 1.94-2.02 (m, 2H), 1.23-1.48 (m, 7H), 0.92 (t, J=6.9 Hz, 3H).

Composition Evaluation Example

In the following invention, example (A) containing the compound from Example 13 (3-((2-methylenehexyl)oxy)propanenitrile) and a comparative example B containing commercial compound methyl nonyl ketone illustrate composition evaluation study in a woody accord fragrance for use in shampoo (C=blank), IPM=Isopropyl myristate.

| Examples | A | B | C |
| --- | --- | --- | --- |
| Raw Materials (parts by weight) | | | |
| Kambernoir SHK | 10 | 10 | 10 |
| Bacdanol | 8 | 8 | 8 |
| Cedryl methyl ketone | 8 | 8 | 8 |
| Eugenyl acetate | 0.5 | 0.5 | 0.5 |
| Iso E Super | 40 | 40 | 40 |
| Isobornyl acetate | 10 | 10 | 10 |
| Iso bornyl cyclo hexenol (IBCH) | 8 | 8 | 8 |
| p-Tertiary butyl cyclohexyl acetate (PTBCA) | 10 | 10 | 10 |
| 3-((2-methylenehexyl)oxy)propanenitrile as 10% w/w solution in IPM | 5.5 | 0 | 0 |
| Methyl nonyl ketone as 10% w/w in IPM | 0 | 5.5 | 0 |
| IPM | 0 | 0 | 5.5 |
| Total | 100 | 100 | 100 |

Introduction of 5.5% weight by weight of 3-((2-methylenehexyl)oxy)propanenitrile 10% w/w in IPM conferred extremely diffusive, powerful woody effects. Additionally, it also imparted a very nice floral character to the whole accord. On the other hand, when methyl nonyl ketone 10% weight by weight in IPM is used in the above accord, only a poor woody effect was observed.

In the following invention, example (A) containing the compound from Example 13 (3-((2-methylenehexyl)oxy)propanenitrile) and a comparative example B containing commercial compound methyl nonyl ketone illustrate composition evaluation study in a fougere accord fragrance for use in shampoo (C=blank), TPM=Isopropyl myristate.

| Examples | A | B | C |
|---|---|---|---|
| Raw Materials (parts by weight) | | | |
| Kambernoir SHK | 7 | 7 | 7 |
| Ambroxan | 0.1 | 0.1 | 0.1 |
| Benzyl acetate | 5.5 | 5.5 | 5.5 |
| Coumarin | 7.5 | 7.5 | 7.5 |
| Dihydromyrcenol | 11.5 | 11.5 | 11.5 |
| Emeraldine | 1 | 1 | 1 |
| Evernyl | 0.3 | 0.3 | 0.3 |
| Geraniol | 19 | 19 | 19 |
| Kflorol | 15 | 15 | 15 |
| Lavandin oil | 7 | 7 | 7 |
| Patchouli Oil | 4 | 4 | 4 |
| Tonalid | 8 | 8 | 8 |
| 3-((2-methylenehexyl)oxy)propanenitrile as 10% w/w solution in IPM | 14.1 | 0 | 0 |
| Methyl nonyl ketone as 10% w/w in IPM | 0 | 14.1 | 0 |
| IPM | 0 | 0 | 14.1 |
| Total | 100 | 100 | 100 |

Introduction of 14.100 weight by weight of 3-((2-methylenehexyl)oxy)propanenitrile 1000 w/w in IPM gives nice enhanced fougere character. Additionally, it also imparts increased strength to the whole accord. On the other hand, when methyl nonyl ketone 10% weight by weight in IPM is used in the above accord, only a poor fougere effect is observed.

In the following invention, example (A) containing the compound from Example 13 (3-((2-methylenehexyl)oxy)propanenitrile) and a comparative example B containing commercial compound methyl nonyl ketone illustrate composition evaluation study in a citrus accord fragrance for use in fabric softner (C=blank), TPM=Isopropyl myristate.

| Examples | A | B | C |
|---|---|---|---|
| Raw Materials (parts by weight) | | | |
| Aldehyde C10 | 4 | 4 | 4 |
| Citral | 2.5 | 2.5 | 2.5 |
| Citronellyl nitrile | 6.5 | 6.5 | 6.5 |
| Delta Decalactone | 0.1 | 0.1 | 0.1 |
| Ethyl maltol 10% | 2.5 | 2.5 | 2.5 |
| Hedione | 7.5 | 7.5 | 7.5 |
| Litsea Cubeba Terpenes | 18 | 18 | 18 |
| Orange Oil CP | 56 | 56 | 56 |
| TR-2 Dodecanal 10% | 2 | 2 | 2 |
| 3-((2-methylenehexyl)oxy)propanenitrile as 10% w/w solution in IPM | 0.9 | 0 | 0 |
| Methyl nonyl ketone as 10% w/w in IPM | 0 | 0.9 | 0 |
| IPM | 0 | 0 | 0.9 |
| Total | 100 | 100 | 100 |

Introduction of 0.900 weight by weight of 3-((2-methylenehexyl)oxy)propanenitrile 10% w/w in TPM gives nice citrus freshness enhanced character. Additionally, it also imparts increased strength to the whole accord with more organg juicy sparkling character. On the other hand, when methyl nonyl ketone 10% weight by weight in IPM is used in the above accord, only a poor citrus effect is observed.

In the following invention, example (A) containing the compound from Example 13 (3-((2-methylenehexyl)oxy)propanenitrile) and a comparative example B containing commercial compound methyl nonyl ketone illustrate composition evaluation study in a rose accord fragrance for use in fabric softner (C=blank), TPM=Isopropyl myristate.

| Examples | A | B | C |
|---|---|---|---|
| Raw Materials (parts by weight) | | | |
| Phenyl ethyl alcohol | 40 | 40 | 40 |
| Geraniol | 20 | 20 | 20 |
| Citronellol | 9 | 9 | 9 |
| Geranyl acetate | 7.5 | 7.5 | 7.5 |
| Kflorol | 7.5 | 7.5 | 7.5 |
| p-Tertiary butyl cyclohexyl acetate (PTBCA) | 3.5 | 3.5 | 3.5 |
| Eugenol | 2 | 2 | 2 |
| Rose oxide | 0.5 | 0.5 | 0.5 |
| 3-((2-methylenehexyl)oxy)propanenitrile as 10% w/w solution in IPM | 10 | 0 | 0 |
| Methyl nonyl ketone as 10% w/w in IPM | 0 | 10 | 0 |
| IPM | 0 | 0 | 10 |
| Total | 100 | 100 | 100 |

Introduction of 10% weight by weight of 3-((2-methylenehexyl)oxy)propanenitrile 10% w/w in IPM gives more floral, rosy enhanced character. Additionally, it also imparts increased strength to the whole accord with sweet, chocolate note. On the other hand, when methyl nonyl ketone 10% weight by weight in IPM is used in the above accord, only a poor rose effect is observed.

The invention claimed is:

1. A compound of formula (I)

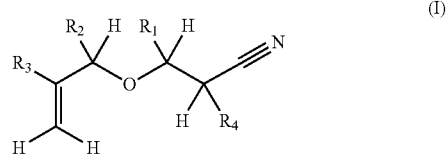

wherein $R_1$ is a hydrogen atom or a methyl group; $R_2$ is a hydrogen atom or is an alkyl group having up to 9 carbon atoms or an alkenyl group containing up to 9 carbon atoms; $R_3$ is either an alkyl group having up to 9 carbon atoms or an alkenyl group containing up to 9 carbon atoms; $R_4$ is a hydrogen atom or a methyl group or an alkyl group having up to 9 carbon atoms or an alkenyl group containing up to 9 carbon atoms; with the proviso that that compounds of formula (I) cannot be the following compounds of formula (I)
wherein $R_3$ is a methyl group, $R_2$ is hydrogen, $R_4$ is hydrogen, and $R_1$ is hydrogen or a methyl group, and wherein $R_3$ is a methyl group, $R_2$ is hydrogen, $R_4$ is a methyl group, and $R_1$ is hydrogen.

2. The compound of formula (I) according to claim 1 wherein $R_4$ is hydrogen, methyl, ethyl, n-propyl, i-propyl, n-butyl, isobutyl, n-pentyl, n-hexyl, n-heptyl, n-octyl, n-nonyl or 9-octenyl.

3. The compound of formula (I) according to claim 1 wherein $R_2$ is a hydrogen atom or is an alkyl or alkenyl group having up to 5 carbon atoms.

4. The compound of formula (I) according to claim 1 wherein $R_2$ is methyl, ethyl, n-propyl, i-propyl, n-butyl, isobutyl, or n-pentyl.

5. The compound of formula (I) according to claim 1 wherein $R_3$ is methyl, ethyl, n-propyl, i-propyl, n-butyl, n-pentyl, n-hexyl, n-heptyl, n-octyl, n-nonyl or 9-octenyl.

6. The compound of formula (I) according to claim 1 selected from:
1) 3-(3-methyl-2-methylenebutoxy)propanenitrile;
2) 3-((5-methyl-4-methylenehexan-3-yl)oxy)butanenitrile;
3) 3-(2-methylenebutoxy)propanenitrile;
4) 3-(2-methylenebutoxy)butanenitrile;
5) 3-((3-methylenepentan-2-yl)oxy)propanenitrile;
6) 3-((3-methylenepentan-2-yl)oxy)butanenitrile;
7) 3-((4-methylenehexan-3-yl)oxy)propanenitrile;
8) 3-((4-methylenehexan-3-yl)oxy)butanenitrile;
9) 3-((2-methylenepentyl)oxy)propanenitrile;
10) 3-((3-methylenehexan-2-yl)oxy)propanenitrile;
11) 3-((3-methylenehexan-2-yl)oxy)butanenitrile;
12) 3-((4-methyleneheptan-3-yl)oxy)propanenitrile;
13) 3-((2-methylenehexyl)oxy)propanenitrile;
14) 3-((2-methylenehexyl)oxy)butanenitrile;
15) 3-((4-methyleneoctan-3-yl)oxy)propanenitrile;
16) 3-((4-methyleneoctan-3-yl)oxy)butanenitrile;
17) 3-((2-methyleneheptyl)oxy)propanenitrile;
18) 3-((2-methyleneheptyl)oxy)butanenitrile;
19) 3-((3-methyleneoctan-2-yl)oxy)propanenitrile;
20) 3-((3-methyleneoctan-2-yl)oxy)butanenitrile;
21) 3-((4-methylenenonan-3-yl)oxy)propanenitrile;
22) 3-((4-methylenenonan-3-yl)oxy)butanenitrile;
23) 3-((2-methyleneoctyl)oxy)butanenitrile;
24) 3-((3-methylenenonan-2-yl)oxy)propanenitrile;
25) 3-((4-methylenedecan-3-yl)oxy)propanenitrile;
26) 3-((4-methylenedecan-3-yl)oxy)butanenitrile;
27) 3-((2-methylenenonyl)oxy)propanenitrile;
28) 3-((3-methylenedecan-2-yl)oxy)propanenitrile;
29) 3-((3-methylenedecan-2-yl)oxy)butanenitrile;
30) 3-((2-methylenedec-9-en-1-yl)oxy)propanenitrile;
31) 3-((2-methylenedec-9-en-1-yl)oxy)butanenitrile;
32) 3-((2-methyl-5-methylenenonan-4-yl)oxy)propanenitrile;
33) 3-((2-methyl-5-methylenenonan-4-yl)oxy)butanenitrile;
34) 3-((6-methylenedecan-5-yl)oxy)propanenitrile;
35) 3-((6-methylenedecan-5-yl)oxy)butanenitrile;
36) 2-(((2-methylenehexyl)oxy)methyl)hexanenitrile;
37) 2-(((2-methylenehexyl)oxy)methyl)pentanenitrile;
38) 3-methyl-2-(((2-methylenehexyl)oxy)methyl)butanenitrile;
39) 2-((3-methyl-2-methylenebutoxy)methyl)pentanenitrile;
40) 3-((5-methylenenon-1-en-4-yl)oxy)propanenitrile;
41) 3-((5-methylenenon-1-en-4-yl)oxy)butanenitrile; or
42) 2-(((2-methylenehexyl)oxy)methyl)butanenitrile.

7. The compound of formula (I) according to claim 1 selected from 3-((2-methylenehexyl)oxy)propanenitrile, 3-((3-methylenehexan-2-yl)oxy)propanenitrile, 3-((3-methylenepentan-2-yl)oxy)butanenitrile, 3-((4-methylenehexan-3-yl)oxy)butanenitrile, 3-((3-methylenehexan-2-yl)oxy)butanenitrile, or 3-((4-methyleneheptan-3-yl)oxy)propanenitrile.

8. A fragrance, flavor and/or deodorizing/masking composition comprising the compound of formula (I) according to claim 1.

9. A fragrance, flavor and/or deodorizing/masking composition comprising the compound of formula (I) according to claim 1 wherein the content of the compound of formula (I) is at least 0.1 wt. %.

10. The fragrance, flavor and/or deodorizing/masking composition according to claim 9 wherein the content of the compound of formula (I) is at least 1 wt. %.

11. The fragrance, flavor and/or deodorizing/masking composition according to claim 9 wherein the content of the compound of formula (I) is below 50 wt. %.

12. The fragrance, flavor and/or deodorizing/masking composition according to claim 10 wherein the content of the compound of formula (I) is below 25 wt. %.

13. A perfumed or flavored product comprising the fragrance, flavor and/or deodorizing/masking composition according to claim 8.

14. A perfumed or flavored product comprising the compound of formula (I) according to claim 1.

15. The compound of formula (I) according to claim 1 wherein $R_4$ is hydrogen.

* * * * *